United States Patent Office 3,781,428
Patented Dec. 25, 1973

3,781,428
HYDROPHOBIC INSECTICIDAL COMPOSITIONS
Claude Hennart, Aubervilliers, France, and Laszlo Moldovanyi, Basel, and Willy Roth, Strengelbach, Switzerland, assignors to Ciba-Geigy AG, Basel, Switzerland
Filed Jan. 5, 1971, Ser. No. 104,059
Claims priority, application Luxembourg, Jan. 9, 1970, 60,170
Int. Cl. A01n 9/36
U.S. Cl. 424—219
24 Claims

ABSTRACT OF THE DISCLOSURE

Hydrophobic insecticidal compositions comprising as essential components certain volatile phosphoric or thiophosphoric acid esters, at least one straight—or branched—chain higher alkane having at least 18 carbon atoms and having a vapor pressure at 20° C. of less than 0.001 torr, and a melting point of less than 120° C., and at least one incorporating agent which has a vapor pressure at 20° C. of less than 0.01 torr, and a melting point of less than 120° C. and which is selected from certain alkanones, certain alkenones, certain alkanophenones, certain halogenated alkanes, certain hydrocarbons and halogenohydrocarbons having at least one benzene nucleus and certain carboxylic acid esters of alkanols or alkanediols. These compositions are useful in evaporators for producing an atmosphere toxic to insects.

---

The present invention concerns, as novel industrial products, insecticidal compositions containing as active ingredient, one or more phosphoric acid esters protected against the destructive action of humidity.

The phosphoric acid esters are considered the most effective of insecticidally active substances and are thus of great interest; of these, O,O-dimethyl O-(2,2-dichlorovinyl) phosphate, known under the name of DDVP, is at present used worldwide in so-called "evaporating" devices, wherein advantage is taken of its volatility to obtain a constant toxic atmosphere for insects.

The phosphoric acid esters, and DDVP in particular, however have the serious disadvantage of being sensitive to humidity which promotes a rapid decomposition of these esters. Various compositions, several of which are now on the market, have been conceived, which contain a diluent of the phosphoric acid ester for the purpose of protecting it against atmospheric humidity and at the same time to slow down the rate of evaporation. One of these compositions is based on a polymer such as polyvinyl chloride; such a composition, having a very high melting point, can only be worked by extrusion and is of necessity a complicated and expensive material; furthermore the amounts of the phosphoric acid ester admissable in such a composition are generallly small.

Another type of compositions utilizes sublimable substances as diluents; these diluents, when sublimizing into the atmosphere disseminate a strong odor which is usually disagreeable such as is the case, for example, with napthalene, paradichlorobenzene or campher, and/or is irritating as is the case with benzoic acid; furthermore, these diluents only have the purpose of regulating the evaporation of the phosphoric acid ester and they do not protect at all against the action of humidity.

Another type of compositions utilizes higher fatty alcohols as diluents; these alcohols are not chemically inert towards the phosphoric acid esters; they react with them to decompose them at a faster or slower rate so that these compositions are not stable over a period of time.

Another type of composition utilizes fatty acids as diluents; these compositions are not inert to the phosphoric acid esters either, and usually the phenomenon of transesterification takes place so that these compositions are often not very stable.

Compositions utilizing saturated aliphatic hydrocarbons as diluents have been described, but these hydrocarbons often have a weak dissolving power for the phosphoric acid esters.

Compositions in which the dissolving power of the volatile, saturated aliphatic hydrocarbons is reinforced by a co-solvent which is also volatile are already known (Belgian Pat. No. 734,818 granted to the applicant Dec. 19, 1969); the hydrocarbons and the co-solvents used in these compositions are light, volatile substances having a vapor pressure at 20° C. consisting of from 0.001 to 30 torr; in this manner completely volatile, liquid compositions are obtained which can be used only for a wick evaporator, but the cost of such a device necessary for containing such a toxic composition is always high when the safety which is must have is allowed for.

A hydrophobic composition containing a volatile phosphoric acid ester and having a rigid structure or which may be made rigid by an absorbent support without necessitating a wick evaporator would thus have definite economic advantages.

It would seem obvious to prepare such a hydrophobic composition by using a non-volatile higher hydrocarbon, but it must be borne in mind that although the phosphoric acid esters in question are slightly soluble in lower saturated hydrocarbons, it is not insignificant that their solubility rapidly decreases with an increase of the molecular weight of the hydrocarbons, this being practically zero for solid paraffins, vaselines, and paraffin and vaseline oils.

Besides, the hydrophobic effect of the compositions containing the volatile hydrocarbons is principally due to the atmosphere saturated by the vapors of the hydrocarbons surrounding the composition at the time of its evaporation. This atmosphere protects the volatile and easily hydrolyzable insecticide in the composition against the attack of atmospheric humidity. This protection no longer exists when the volatile hydrocarbon is replaced by a non-volatile hydrocarbon.

The applicant has found the surprising fact that it was possible to introduce considerable amounts of a phosphoric acid ester of the type concerned into a saturated, aliphatic hydrocarbon of higher molecular weight when a suitable incorporating agent of reduced or practically negligible volatility was added to the hydrocarbon and that, even though the phosphoric acid ester was not protected by the vapors of the hydrocarbon surrounding the composition, it was in spite of this very well protected against the action of hydrolysis and humidity.

The incorporating agents must be good solvents for the phosphoric acid ester used; it has, indeed, been found by the applicant that the incorporating agents which are not solvents for the phosphoric acid esters, having a purely mechanical effect, have very pronounced hydrophilic properties and that the compositions obtained with their aid do not protect the phosphoric acid ester for any length of time against decomposition; this is the case, for example, with the compositions described in French Pat. No. 1,562,932 granted to the applicant on Mar. 3, 1969, in which compositions an adsorbing agent such as vermiculite or fossil silica is used, when these compositions are brought into contact with the surrounding atmosphere which always contains a considerable amount of humidity.

It could be feared, on the other hand, that the use of an incorporating agent which is too volatile could upset the physical equilibrium of the composition during the evaporation due to the disappearance of the incorporating agent; for this reason the preferred incorporating agents have a vapor pressure of less than 0.001 torr at 20° C. The applicant, however, has found the equally surprising fact that the volatile incorporating agents are also suitable, as is shown in the various experiments given further below.

The invention provides hydrophobic insecticidal compositions comprising as essential components:

(A) 5 to 90% of an active substance selected from the group of volatile phosphoric or thiophosphoric acid esters defined by the following formula:

(I)

wherein X is an oxygen or sulphur atom, R and R' are the same or different and represent alkyl radicals containing 1 to 4 carbon atoms, R'' being selected from one of the following two groups (i) and (ii):

(i)

(II)

(ii)

(III)

wherein Y is selected from halogens having at most an atomic weight of 80, and R''' and R'''', identical or different, are selected from a hydrogen, said halogens, or the methyl or ethyl radical;

(B) At least one straight or branched chain higher alkane having at least 18 carbon atoms and having a melting point of less than 120° C. and a vapor pressure at 20° C. of less than 0.001 torr; and (C) At least one incorporating agent which has a vapor pressure at 20° C. of less than 0.05 torr and a melting point of less than 120° C. and is selected from:

(1) alkanones having 11 to 55 carbon atoms, alkenones having 12 to 35 carbon atoms, and alkanophenones represented by the formula (IV)

wherein $R_a$ is an alkyl radical having at most 19 carbon atoms, and $R_a'$ represents hydrogen or 1 to 3 substituents selected from halogens, alkyl radicals having 1 to 5 carbon atoms, and alkoxy groups having 1 to 4 carbon atoms;

(2) halogenated alkanes having at least 8 carbon atoms in which the halogen does not exceed 50% by weight, said halogen being selected from chlorine and bromine;

(3) hydrocarbons and halogeno-hydrocarbons having at least one benzene ring represented by the formula:

(V)

wherein $R_b$ represents hydrogen and/or 1 to 4 chlorine or bromine atoms and/or 1 to 4 alkyl radicals having 1 to 4 carbon atoms and/or an alkoxy radical having 1 to 5 carbon atoms and/or 1 or 2 vinyl radicals, $R_b'$ represents hydrogen or a chlorine or bromine atom or an alkyl radical having 1 to 4 carbon atoms, $R_b''$ represents the phenyl radical, the phenyl radical substituted by 1 to 5 chlorine atoms, the biphenyl radical, the biphenyl radical substituted by 1 to 9 chlorine atoms, the benzyl radical, the phenethyl radical, the styryl radical, the phenoxy radical, the benzyloxy radical, an alkoxy group having 1 to 5 carbon atoms, or an alkyl radical having 1 to 12 carbon atoms, or $R_b'$ and $R_b''$, taken together, represent a divalent radical selected from
  (a) the 1-propene-1,3-diyl radical;
  (b) the 1-oxa-2,3-propene-1,3-diyl radical;
  (c) the above radicals (a) and (b) substituted by 1 to 2 substituents selected from
    lower alkyl radicals having 1 to 3 carbon atoms,
    lower alkoxy radicals having 1 to 3 carbon atoms,
    the phenyl radical,
    chlorine or bromine;
  (d) the orthobenzylene radical;
  (e) the ortho-phenylene-oxy radical; and
  (f) the above radicals (d) and (e) substituted by 1 to 4 substituents selected from
    alkyl radicals having 1 to 3 carbon atoms,
    alkoxy radicals having 1 to 4 carbon atoms,
    chlorine and bromine, and
    at most 3 phenyl radicals, and
    at most one vinyl radical;

(4) carboxylic acid esters selected from esters formed from
  monocarboxy alkanes and alkanols,
  monocarboxy alkenes and alkanols,
  diesters formed from
    dicarboxy hydrocarbons and alkanols, and
    monocarboxy hydrocarbons and alkane diols;

the amount of incorporating agent C, calculated on the weight of the mixture of components B+C comprises from 10 to 80%; the amount of the mixture of components B+C calculated on the weight of the mixture A+B+C comprises from 10 to 95%.

The compositions according to the invention may also contain non-essential components of supplementary substances selected from insecticidal compounds other than component A, insect repellent compounds, scents, deodorants, bactericides, germicides, disinfectants, dyestuffs, stabilizers, and from inert fillers and diluents other than components B and C, and thickening agents and/or dispersing agents.

Of the incorporating agents defined under (C) which are frequently preferred, because of the large proportion of phosphoic acid ester which may then be introduced into the composition and because of the remarkable stability which they confer to the phosphoric acid esters, there are the following compounds:

(1') alkanones having at least 20 carbon atoms, alkenones having at least 20 carbon atoms, and alkanophenones represented by the Formula V wherein $R_a$ represents an alkyl radical having at least 15 carbon atoms, and $R_a'$ has the same meaning as in the definition given above;

(2') chloro-alkanes, bromo-alkanes and chloro-bromoalkanes having at least 16 carbon atoms and in which the amount of halogen does not exceed 50% by weight;

(3') hydrocarbons and halogeno-hydrocarbons having at least one benzene ring represented by the formula:

(V)

wherein $R_b$ represents hydrogen or 1 to 4 chlorine or bromine atoms and/or 1 to 2 vinyl radicals, $R_b'$ represents hydrogen or a chlorine or bromine atom, and $R_b''$ represents the phenyl radical, the phenyl radical substituted by 1 to 5 chlorine atoms, the biphenyl radical, the biphenyl radical substituted by 1 to 9 chlorine atoms, the benzyl radical, the phenethyl radical, the styryl radical, the phenoxy radical, the benzyloxy radical, or an alkyl radical having at least 8 carbon atoms, or $R_b'$ and $R_b''$, taken together, represent a divalent radical selected from
- (a) the 1-propene-1,3-diyl radical;
- (b) the 1-oxa-2,3-propene-1,3-diyl radical;
- (c) the above radicals (a) and (b) substituted by 1 to 2 substituents selected from
  - lower alkyl radicals having 1 to 3 carbon atoms,
  - lower alkoxy radicals having 1 to 3 carbon atoms,
  - the phenyl radical,
  - chlorine or bromine;
- (d) the orthobenzylene radical;
- (e) the ortho-phenylene-oxy radical; and
- (f) the above radicals (d) and (e) substituted by 1 to 4 substituents selected from
  - alkyl radicals having 1 to 3 carbon atoms,
  - alkoxy radicals having 1 to 4 carbon atoms,
  - chlorine and bromine, and
  - at most 3 phenyl radicals, and
  - at most one vinyl radical.

Such an insecticidal composition is a liquid, a paste, or a solid; it is possible to greatly vary the amount of active ingredient; it is chemically stable and the active ingredient contained herein is protected against decomposition by humidity; it has a very low production cost.

In a preferred embodiment, the composition contains from 20 to 80% of active ingredient, calculated on the weight of the composition, and from 30 to 75% of the mixture of B and C consisting of at least one higher alkane and one incorporating agent; the amounts of incorporating agent in the mixture of B+C comprising, preferably, from 20 to 60%, calculated on the weight of said mixture.

The following phosphoric and thiophosphoric acid esters are given as non-limitative example of esters corresponding to the above-given Formula I:

O,O-dimethyl O-(2,2-dichlorovinyl)phosphate,
O,O-dimethyl O-(2-chlorovinyl)phosphate,
O,O-diethyl O-(2,2-dichlorovinyl)phosphate,
O,O-diethyl O-(2-chlorovinyl)phosphate,
O,O-dipropyl O-(2-chlorovinyl)phosphate,
O,O-diisopropyl O-(2-chlorovinyl)phosphate,
O,O-dibutyl O-(2-chlorovinyl)phosphate,
O,O-diisobutyl O-(2-chlorovinyl)phosphate,
O,O-dimethyl O-(2,2-dibromovinyl)phosphate,
O,O-dimethyl O-(2-bromovinyl)phosphate,
O,O-diethyl O-(2-bromovinyl)phosphate,
O,O-dimethyl O-(2-bromo-2-chlorovinyl)phosphate,
O,O-diethyl O-(2-bromo-2-chlorovinyl)phosphate,
O-ethyl O-methyl O-(2,2-dichlorovinyl)phosphate,
O,O-dimethyl O-(1,2-dibromo-2,2-dichloroethyl)phosphate,
O,O-dimethyl O-(1-bromo-2,2,2-trichloroethyl)phosphate,
O,O-dimethyl O-(1,2,2,2-tetrabromoethyl)phosphate,
O,O-dimethyl O-(1,2-dibromo-2,2-dichloropropyl)phosphate,
O,O-dimethyl O-(2-chloro-1-methylvinyl)phosphate,
O,O-dimethyl O-(2-chloro-2-methylvinyl)phosphate,
O,O-dimethyl O-(2,2-dichloro-1-methylvinyl)phosphate,
O,O-dimethyl O-(2-chloro-1-ethylvinyl) phosphate,
O,O-dimethyl O-(2-chloro-2-ethylvinyl)phosphate,
O,O-dimethyl O-(2-chloro-1,2-dimethylvinyl)phosphate,
O,O-dimethyl O-(2-chloro-1-methylvinyl)phosphate,
O,O-dimethyl O1(2-chlorovinyl)phosphorothioate,
O,O-dimethyl O-(2-chloro-1-methylvinyl)phosphorothioate,
O,O-dimethyl O-(2-chloro-2-methylvinyl)phosphorothioate, According to the present invention, the preferred esters of those listed above are those in which the radical $R''$ is a group $-CH=CCl_2$, and A represents an oxygen atom, i.e. O,O-dialkyl O-(2,2-dichlorovinyl)phosphates, which latter encompass O,O-dimethyl O-(2,2-dichlorovinyl)phosphate known under the names of DDVP and Dichlorvos.

The preferred higher alkanes are those which are found pure or in mixtures in nature; they can also be obtained by synthesis.

The following, which may be used alone or in mixtures, are given as non-limitative examples of preferred higher alkanes:

| | |
|---|---|
| n-Octadecane | $C_{18}H_{38}$. |
| n-Nonadecane | $C_{19}H_{40}$. |
| n-Eicosane | $C_{20}H_{42}$. |
| n-Heneicosane | $C_{21}H_{44}$. |
| n-Docosane | $C_{22}H_{46}$. |
| n-Tricosane | $C_{23}H_{48}$. |
| n-Tetracosane | $C_{24}H_{50}$. |
| 2-methyl-tricosane | $C_{24}H_{50}$. |
| 2,2-dimethyl-docosane | $C_{24}H_{50}$. |
| 13-methyl-pentacosane | $C_{26}H_{54}$. |
| n-Octacosane | $C_{28}H_{58}$. |
| 10-nonyl-nonadecane | $C_{28}H_{58}$. |
| n-Triacontane | $C_{30}H_{62}$. |
| 2,6,10,15,19,23-hexamethyl-tetracosane | $C_{30}H_{62}$ (squalane). |
| n-Hentriacontane | $C_{31}H_{64}$. |
| n-Dotriacontane | $C_{32}H_{66}$. |
| n-Tetratriacontane | $C_{34}H_{70}$. |
| n-Pentatriacontane | $C_{35}H_{72}$. |
| n-Hexatriacontane | $C_{36}H_{74}$. |
| n-Tetracontane | $C_{40}H_{82}$. |
| n-Tritetracontane | $C_{43}H_{88}$. |
| 22-methyl-tritetracontane | $C_{44}H_{90}$. |

Of the preferred mixtures of higher alkanes, there may be mentioned the liquid mixtures known as Vaseline oil, paraffin oil, heavy oil, gas oil, fuel oil, road oil, valve oil, diesel oil; the semi-solid mixtures known as Vaseline Cheesebrough-Pond trademark for petroleum jelly, petroleum, crude paraffin; the micro-crystalline waxy mixtures (crystals finer than 5 microns) known as microwax, tank bottom wax, ozocerite, ceresine, isoparaffins; and the non-waxy, macrocrystalline solid mixtures (crystals larger than 5 microns) known as ordinary paraffin.

Of the incorporating agents defined under class C (1), the following may, for example, be used:

| | |
|---|---|
| 2-hendecanone | $CH_3-CO-C_9H_{19}$. |
| 6-hendecanone | $C_5H_{11}-CO-C_5H_{11}$ (valerone). |
| 2-methyl-4-hendecanone | $(CH_3)_2-CH-CH_2-CO-C_7H_{15}$. |
| 11-dodecen-2-one | $CH_2=CH-(CH_2)_8-CO-CH_3$. |
| 7-tridecanone | $C_6H_{13}-CO-C_6H_{13}$ (caprone). |
| 12-tridecen-3-one | $CH_2=CH-(CH_2)_8-CO-C_2H_5$. |
| 2-pentadecanone | $CH_3-CO-C_{13}H_{27}$. |
| 4-pentadecanone | $C_3H_7-CO-C_{11}H_{23}$. |
| 8-pentadecanone | $C_7H_{15}-CO-C_7H_{15}$ (caprilone). |
| 3-hexadecanone | $C_2H_5-CO-C_{13}H_{27}$. |
| 2-heptadecanone | $CH_3-CO-C_{15}H_{31}$. |
| 9-heptadecanone | $C_8H_{17}-CO-C_8H_{17}$ (pelargone). |
| 2-octadecanone | $CH_3-CO-C_{16}H_{33}$. |
| 3-octadecanone | $C_2H_5-CO-C_{15}H_{31}$. |
| 4-octadecanone | $C_3H_7-CO-C_{14}H_{29}$. |
| 6-octadecanone | $C_5H_{11}-CO-C_{12}H_{25}$. |
| 2-nonadecanone | $CH_3-CO-C_{17}H_{35}$. |
| 10-nonadecanone | $C_9H_{19}-CO-C_9H_{19}$ (caprinone). |
| Acetophenone | $C_6H_5-CO-CH_3$. |
| Propiophenone | $C_6H_5-CO-CH_2-CH_3$. |
| Butyrophenone | $C_6H_5-CO-(CH_2)_2-CH_3$. |
| Valerophenone | $C_6H_5-CO-(CH_2)_3-CH_3$. |
| Caprophenone | $C_6H_5-CO-(CH_2)_4-CH_3$. |
| Heptanophenone | $C_6H_5-CO-(CH_2)_5-CH_3$. |
| Octanophenone | $C_6H_5-CO-(CH_2)_6-CH_3$. |
| Decanophenone | $C_6H_5-CO-(CH_2)_8-CH_3$. |
| Laurophenone | $C_6H_5-CO-(CH_2)_{10}-CH_3$. |
| 4-chloro-acetophenone | $C_6H_4Cl-CO-CH_3$. |
| 3,4-dichlor-acetophenone | $C_6H_3Cl_2-CO-CH_3$. |
| 4-chloro-propiophenone | $C_6H_4Cl-CO-CH_2-CH_3$. |
| 4-methyl-acetophenone | $CH_3-C_6H_4-CO-CH_3$. |
| 4-methyl-butyrophenone | $CH_3-C_6H_4-CO-(CH_2)_2-CH_3$. |
| 2,4,6-trimethyl-acetophenone | $(CH_3)_3C_6H_2-CO-CH_3$. |
| 4-methyl-valerophenone | $CH_3-C_6H_4-CO-(CH_2)_3-CH_3$. |
| 4-tert-butyl-acetophenone | $C_4H_9-C_6H_4-CO-CH_3$. |
| 4-methoxy-acetophenone | $CH_3-O-C_6H_4-CO-CH_3$. |
| 4-fluoro-acetophenone | $C_6H_4F-CO-CH_3$. |
| 3,4,5-trimethoxy-acetophenone | $(CH_3O)_3C_6H_2-CO-CH_3$. |
| 2,4-dimethoxy-acetophenone | $(CH_3O)_2C_6H_3-CO-CH_3$. |
| 4-methoxy-acetophenone | $(CH_3O)C_6H_4-CO-CH_3$. |
| 2-methoxy-acetophenone | $(CH_3O)C_6H_4-CO-CH_3$. |
| 4-tert-butyl-propiophenone | $C_4H_9-C_6H_4-CO-CH_2-CH_3$. |
| 4-tert-amyl-acetophenone | $C_5H_{11}-C_6H_4-CO-CH_3$. |
| 2,4-dibromo-acetophenone | $C_6H_3Br-CO-CH_3$. |
| 4-butoxy-acetophenone | $C_4H_9O-C_6H_4-CO-CH_3$. |

Of the preferred incorporating agents given under C(1'), the following may, for example, be used:

| | |
|---|---|
| 2-eicosanone | $CH_3CO-C_{18}H_{37}$ |
| 3-eicosanone | $C_2H_5-CO-C_{17}H_{35}$ |
| 2-heneicosanone | $CH_3-CO-C_{19}H_{39}$ |
| 11-heneicosanone | $C_{10}H_{21}-CO-C_{10}H_{21}$ |
| 1,20-heneicosadien-11-one | $C_{11}H_{19}-CO-C_{10}H_{19}$ |
| 2-docosanone | $CH_3-CO-C_{20}H_{41}$ |
| 2-tricosanone | $CH_3-CO-C_{21}H_{43}$ |
| 12-tricosanone | $C_{11}H_{23}-CO-C_{11}H_{23}$ (laurone) |
| 14-heptacosanone | $C_{13}H_{27}-CO-C_{13}H_{27}$ (myristone) |
| 16-hentriacontanone | $C_{15}H_{31}-CO-C_{15}H_{31}$ (palmitone) |
| 18-pentatriacontanone | $C_{17}H_{35}-CO-C_{17}H_{35}$ (stearone) |
| 20-nonatriacontanone | $C_{19}H_{39}-CO-C_{19}H_{39}$ (arachidone) |
| 22-tritetracontanone | $C_{21}H_{43}-CO-C_{21}H_{43}$ (behenone) |
| 26-henpentacontanone | $C_{25}H_{51}-CO-C_{25}H_{51}$ (cerotone) |
| 28-pentapentacontanone | $C_{27}H_{55}-CO-C_{27}H_{55}$ (montanone) |
| 9,26-pentatriacontadien-18-one | $C_{17}H_{33}-CO-C_{17}H_{33}$ (oleone) |
| 6,9,26,29-pentatriacontatetraen-18-one | $C_{17}H_{31}-CO-C_{17}H_{31}$ (linoleone) |
| 3,6,9,26,29,32-pentatriacontahexaen-18-one | $C_{17}H_{29}-CO-C_{17}H_{29}$ (linolenone) |
| Myristophenone | $C_6H_5-CO-(CH_2)_{12}-CH_3$ |
| Palmitophenone | $C_6H_5-CO-(CH_2)_{14}-CH_3$ |
| Stearophenone | $C_6H_5-CO-(CH_2)_{16}-CH_3$ |
| Arachidophenone | $C_6H_5-CO-(CH_2)_{18}-CH_3$ |

Of the incorporating agents defined under the class C(2), the following, for example, may be used:

| | |
|---|---|
| 1-bromo-octane | $Br-(CH_2)_7-CH_3$ |
| 2-bromo-octane | $CH_3-CHBr-(CH_2)_5-CH_3$ |
| 1-bromo-decane | $Br-(CH_2)_9-CH_3$ |
| 2-bromo-decane | $CH_3-CHBr-(CH_2)_7-CH_3$ |
| 1-chloro-decane | $Cl-(CH_2)_9-CH_3$ |
| 1-bromo-dodecane | $Br-(CH_2)_{11}-CH_3$ |
| 2-bromo-dodecane | $CH_3-CHBr-(CH_2)_9-CH_3$ |
| 1-chloro-dodecane | $Cl-(CH_2)_{11}-CH_3$ |
| 2-chloro-dodecane | $CH_3-CHCl-(CH_2)_9-CH_3$ |
| 1-bromo-tetradecane | $Br-(CH_2)_{13}-CH_3$ |
| 1-chloro-tetradecane | $Cl-(CH_2)_{13}-CH_3$ |

Of the preferred incorporating agents defined under the class C(2'), the following, for example, may be used:

| | |
|---|---|
| 1-bromo-hexadecane | $Br-(CH_2)_{15}-CH_3$ |
| 1-chloro-hexadecane | $Cl-(CH_2)_{15}-CH_3$ |
| 1-bromo-octadecane | $Br-(CH_2)_{17}-CH_3$ |
| 1-chloro-octadecane | $Cl-(CH_2)_{17}-CH_3$ |
| 1-chloro-eicosane | $Cl-(CH_2)_{19}-CH_3$ |
| 1-chloro-docosane | $Cl-(CH_2)_{21}-CH_3$ |

Of the incorporating agents defined under the class C(3), the following, for example, may be used:

durene
isodurene
prehnitene
1,3,5-trimethoxy-benzene
1,2-diethoxy-benzene
1,2-dibutoxy-benzene
1,4-dibutoxy-benzene
1,4-di-tert-amyloxy-benzene
1,3,5-tri-tert-butyl-benzene
2-bromo-mesitylene
pentamethyl-benzene
hexamethyl-benzene
1,3-diisopropyl-benzene
4-butyl-toluene
1,4-diisopropyl-benzene
1,3,5-triethyl-benzene
hexyl-benzene
2-bromo-cymene
1,2,4-trichloro-benzene
2,4,6-trichloro-toluene
pentachloro-benzene
4-butoxy-toluene
anisole
4-chloro-anisole
4-vinyl-anisole
2-bromo-phenetole
1,3-dimethoxy-benzene
1,4-dimethoxy-benzene
veratrole
1,4-dichloro-benzene
1,4-diethoxy-benzene
2,4,5-tribromo-phenetole
1,2-dibromo-benzene
1,3,5-trimethoxy-benzene
1,2-diethoxy-benzene
1,2-dibutoxy-benzene
1,4-dibutoxy-benzene
1,4-di-tert-amyloxy-benzene
1,3,5-tri-tert-butyl-benzene;

Of the preferred incorporating agents defined under the class C(3'), the following, for example, may be used:

4-bromo-styrene
2,4-dichloro-styrene
4-isopropyl-styrene
1,3-divinyl-benzene
3-ethyl-vinyl-benzene
1-bromo-styrene
octyl-benzene
dodecyl-benzene
biphenyl
2-chloro-biphenyl
3-chloro-biphenyl
4-chloro-biphenyl
2,2'-dichloro-biphenyl
4,4'-dichloro-biphenyl
2,2',4,4'-tetrachloro-biphenyl
2,2',4,4',6,6'-hexachloro-biphenyl
octachloro-biphenyl
perchloro-biphenyl
o-diphenyl-benzene
p-diphenyl-benzene
pentachloro-diphenyl-benzene
nonachloro-diphenyl-benzene
perchloro-diphenyl-benzene
diphenyl methane
1,2-diphenyl-ethane
stilbene
phenoxy-benzene
indene (1H)
1,3-dimethyl-indene
2,3-dimethyl-indene
2,6-dimethyl-indene
1,3-diphenyl-indene
1-methyl-indene
2-methyl-indene
1-methyl-3-phenyl-indene
4,7-dimethyl-indene
2-phenyl-indene
4-bromo-1-methyl-indene
5-methoxy-indene
benzofuran (or coumarone)
6-methyl-2,3-diphenyl-coumarone
4,5,6,7-tetrachloro-2-phenyl-coumarone
5-bromo-6-methoxy-coumarone
5-chloro-6-methoxy-coumarone
2,3-dimethyl-coumarone
2-methyl-coumarone
3-methyl-coumarone
fluorene (9H)
9-methyl-fluorene
2-phenyl-fluorene
1,4,5,8-tetramethyl-fluorene
2-vinyl-fluorene
2,3,7-trichloro-fluorene
2,7-dibromo-fluorene
2-chloro-7-vinyl-fluorene
4-methyl-1,3,9-triphenyl-fluorene
2-methoxy-fluorene
dibenzofuran (or 9-oxa-fluorene)
2-bromo-dibenzofuran
2,8-dimethoxy-dibenzofuran
2,3,7,8-tetramethoxy-dibenzofuran
1,4-diphenyl-dibenzofuran
2-propyl-dibenzofuran
2-methyl-dibenzofuran 4-methyl-dibenzofuran
2-phenyl-dibenzofuran
3-phenyl-dibenzofuran
4-phenyl-dibenzofuran;

Of the incorporating agents defined under the class C(4), the following, for example, may be used:

| | |
|---|---|
| 2-ethyl-hexyl acetate | $CH_3-CO-O-CH(C_2H_5)-C_5H_{11}$ |
| Dimethyl maleate | $CH_3-O-CO-CH=CH-CO-O-CH_3$ |
| Glycol dipropionate | $C_2H_5-CO-O-(CH_2)_2-O-CO-C_2H_5$ |
| Dimethyl succinate | $CH_3-O-CO-(CH_2)_2-CO-O-CH_3$ |
| Diethyl succinate | $C_2H_5-O-CO-(CH_2)_2-CO-O-C_2H_5$ |
| Diethyl maleate | $C_2H_5-O-CO-CH=CH-CO-O-C_2H_5$ |
| Diethyl fumarate | $C_2H_5-O-CO-CH=CH-CO-O-C_2H_5$ |
| 2-ethyl-butyl 2-ethylbutyrate | $(C_2H_5)_2CH-CO-O-CH_2-CH(C_2H_5)_2$ |
| Diisopropyl maleate | $(CH_3)_2CH-O-CO-CH=CH-CO-O-CH(CH_3)_2$ |
| Hexyl 2-ethyl-butyrate | $(C_2H_5)_2CH-CO-O-C_6H_{13}$ |
| 2-ethyl-butyl hexanoate | $C_5H_{11}-CO-O-CH_2-CH(C_2H_5)_2$ |
| Hexyl hexanoate | $C_5H_{11}-CO-O-C_6H_{13}$ |
| 2-ethyl-hexyl 4-pentenoate | $CH_2=CH-(CH_2)_2-CO-O-CH_2-CH(C_2H_5)(C_4H_9)$ |
| Hexyl 2-ethyl-hexanoate | $(C_4H_9)(C_2H_5)CH-CO-O-C_6H_{13}$ |
| 2-ethyl-hexyl 2-ethyl-butyrate | $(C_2H_5)_2CH-CO-O-CH_2-CH(C_2H_5)(C_4H_9)$ |
| 2-ethyl-butyl 2-ethyl-hexanoate | $(C_4H_9)(C_2H_5)CH-CO-O-CH_2-CH(C_2H_5)_2$ |
| 2-ethyl-hexyl hexanoate | $C_5H_{11}-CO-O-CH_2CH(C_2H_5)(C_4H_9)$ |
| Methyl laurate | $C_{11}H_{23}-CO-O-CH_3$ |
| Ethyl laurate | $C_{11}H_{23}-CO-O-C_2H_5$ |
| Methyl myristate | $C_{13}H_{27}-CO-O-CH_3$ |
| Methyl 10-undecylenoate | $CH_2=CH-(CH_2)_8-CO-O-CH_3$ |
| Dimethyl phthalate | $CH_3-O-CO-C_6H_4-CO-O-CH_3$ |
| Diethyl phthalate | $C_2H_5-O-CO-C_6H_4-CO-O-C_2H_5$ |
| Methyl palmitate | $C_{15}H_{31}-CO-O-CH_3$ |
| Ethyl palmitate | $C_{15}H_{31}-CO-O-C_2H_5$ |
| Dibutyl fumarate | $C_4H_9-O-CO-CH=CH-CO-O-C_4H_9$ |
| Methyl stearate | $C_{17}H_{35}-CO-O-CH_3$ |
| Dibutyl phthalate | $C_4H_9-O-CO-C_6H_4-CO-O-C_4H_9$ |
| Dioctyl succinate | $C_8H_{17}-O-CO-(CH_2)_2-CO-O-C_8H_{17}$ |
| Dioctyl adipate | $C_8H_{17}-O-CO-(CH_2)_4-CO-O-C_8H_{17}$ |
| Dimethyl sebacate | $CH_3-O-CO-(CH_2)_8-CO-O-CH_3$ |
| Diethyl sebacate | $C_2H_5-O-CO-(CH_2)_8-CO-O-C_2H_5$ |
| Dioctyl phthalate | $C_8H_{17}-O-CO-C_6H_4-CO-O-C_8H_{17}$ |
| Didecyl phthalate | $C_{10}H_{21}-O-CO-C_6H_4-CO-O-C_{10}H_{21}$ |
| Dibutyl sebacate | $C_4H_9-O-CO-(CH_2)_8-CO-O-C_4H_9$ |
| Dioctyl azelate | $C_8H_{17}-O-CO-(CH_2)_7-CO-O-C_8H_{17}$ |
| 2,2,2-trimethyl-1,3 pentanediol diisobutyrate | $(CH_3)_2CH-CO-O-CH_2-C(CH_3)_2-CH(C(CH_3)_2)-O-CO-CH(CH_3)_2$ |
| Isopropyl myristate | $C_{13}H_{27}-CO-O-CH(CH_3)_2$ |
| Ethylene glycol dibutyrate | $C_3H_7-CO-O-CH_2-CH_2-O-CO-C_3H_7$ |

The remaining substances, the total amount of which should preferably not exceed 30% by weight of the composition, are advantageously supplemental insecticides and/or insect repellents which may be employed in an amount of from 0.5 to 30% by weight of the composition and preferably from 2 to 15%. For example, there may be advantageously added 1,2,3,4,5,6-hexachloro-cyclohexane and more in particular the gamma isomer thereof known under the name of Lindane, 1,4-dichlorobenzene, naphthalene, bromo-naphthalene, dichloronaphthalenes and aldrine.

The additional substances may also be stabilizing agents for the active ingredient, dyestuffs, pigments, scents and/or deodorants, bacterides, germicides and/or disinfectants, supplemental diluents, thickening agents, dispensing agents, or inert mineral or organic fillers.

The supplemental diluents may be, for example, non-aromatic ethers, amides, nitriles, or non-pesticidal phosphoric acid esters such as the methyl, ethyl, butyl, octyl, decyl, dodecyl, phenyl, cresyl, diphenyl triesters of phosphoric acid.

Of the inert mineral fillers which are suitable for use in the compositions according to the invention, there may be mentioned, for example, brick, pumice, vermiculite, kaolin, dried clay, calcium carbonate, pyrophyllite, dolomite, glass fibers, gypsum, talcium, fossil or non-fossil natural silica, synthetic silica and metallic oxides, and calcium sulphate anhydrite.

Of the organic fillers which are suitable for use in the compositions according to the invention, there may be mentioned, for example, sawdust, cellulosic fibers, corn and potato starch.

Advantageously, the supplemental stabilizers are selected from the group of epoxy compounds defined in French Pat. No. 1,187,378, granted on Mar. 2, 1959, such as epoxidized oils, in particular epoxidized soyabean oil, halogenated epoxy alkanes and alkyl epoxy stearates; from the group of amino compounds or heterocyclic azo compounds defined in French Pat. No. 1,379,851, granted on Oct. 19, 1964, and from the group of the diazenes and their metallic derivatives defined in the Swiss patent application filed by the applicant on Mar. 5, 1970, in Switzerland, which application corresponds to U.S. application Ser. No. 17,918; from the group of sulphur and sulphur compounds, and from the group of benzodioxozoles defined in patent applications Nos. 7,033,013 and 7,033,014, filed on Sept. 11, 1970, in France, said Franch application 7,033,013 corresponding to U.S. application 180,138 and 180,507 and said French application 7,033,014 corresponding to U.S. application No. 180,137, the above U.S. applications being commonly assigned with respect to the present application.

An epoxy compound is employed, for example, in an amount of from 0.1 to 20%, preferably from 0.2 to 10%; an amino compound or heterocyclic azo compound is employed, for example, in an amount of from 0.5 to 10%; a diazene is employed, for example, in an amount of from 0.1 to 5%, preferably from 0.3 to 2%; the sulphur or sulphur compounds are employed for example, in an amount of from 0.05 to 6%; a benzodioxole is employed in amount of 0.2%; the amounts being calculated on the weight of the phosphoric acid ester.

The additional substances may also be thickening agents or dispersing agents such as the aluminum salts of fatty acids, for example aluminum mono-, di- and tristearate, aluminum lactate, or the salts of fatty acids and fatty amines such as hexadecylaminopropylene-amine dioleate, octadecylaminopropylene-amine dioleate, or octadecenylaminopropyleneamine dioleate, or modified montmorillonites such as the ammonium salts of dimethyl-dialkyl hectorite.

The compositions according to the invention may be obtained by simple mixing of the components at a temperature between ambient temperature and 160° C., a temperature below 100° C. generally being sufficient, an optimal temperature being that at which the components are miscible in the chosen proportions; preferably that temperature must allow the components which are normally solids to pass into a liquid state, either by melting or by dissolution.

In the case of compositions according to the invention containing thickening agents and/or dispersing agents, their preparation may be very time-consuming and require one of the following methods:

(1) controlled heating with constant agitation of the paraffin and the thickening agents, dispersing agents and stabilizers, the agitation being continued until a homogeneous liquid mass is obtained having a temperature of from 70 to 150° C.;
(2) addition of the incorporating agent in a liquid state and homogenization thereof;
(3) addition of the DDVP and homogenization;
(4) transferal into molds where solidification takes place at about 40/50° C.;

or, (1) controlled heating at a temperature of 70/150° C. with constant agitation of the mixture containing the DDVP, the thickening agent and/or the dispersing agent and the incorporating agent with 10 to 20% by weight of the paraffin until a homogeneous liquid mass is obtained;
(2) addition of the rest of the paraffin which is molten and contains the other supplementary substances, and homogenization by agitation;
(3) transferal into molds as above.

Thus formulated, the contemplated compositions may be liquids, pastes or solids; they may be, in particular, prepared on a porous or fibrous solid support. This support can consist, for example, of a felt of wool, of cotton and/or of synthetic fibers, a compressed cellulose such as fibers of wood, of grain, of alfalfa or of cotton, a cardboard felt, a cardboard of old paper or a cardboard of glass fibers. The invention thus also contemplates the novel industrial products characterized by comprising a porous or fibrous support such as those described above, which is impregnated with a composition according to the invention. According to an interesting embodiment of the invention, the composition may be covered by a permeable membrane to regulate the flow and/or the evaporation of the active substance.

Such a permeable membrane may consist, for example, of a layer of polyethylene or polypropylene, or a mixture thereof, or of ethylene and propylene copolymer, or of a copolymer containing vinylidene chloride; preferably such a membrane consists of a layer of polyethylene having a thickness of from 10 to 80 microns; examples of such permeable membrane devices are described in French Pat. No. 1,590,647, granted to the applicant on Apr. 20, 1970.

The compositions may also be in the form of molded articles such as, for example, those described in French Pat. No. 1,562,932, granted to the applicant on Mar. 3, 1969.

The hydrophobic properties of the insecticidal compositions according to the invention have been studied in the course of experiments, examples of which are given in the following:

EXPERIMENT I 10 x 10 cm. squares cut from a cardboard felt sold by the French company Mulner & Joncquez under the number J-2-A-60 were used. These squares were put into groups of two and fastened together so that they had a double thickness without appreciably modifying the total surface.

One series of these double cardboards was dried in an oven at 110° C. and each double cardboard was impregnated with 25 g. of DDVP.

Two other series of double cardboards were also dried under the same conditions; the double cardboards of the first series, here designated I–A were each impregnated with 25 g. of a formulation having a temperature of 70° C. and containing 70% of DDVP and 30% of mixture A defined below:

Mixture A: paraffin oil:[a] 3 parts by weight; stearone:[b] 1 part by weight.

The double cardboards of the second series, here designated I–B were each impregnated with 25 g. of a formulation having a temperature of 70° C. and containing 70% by weight of DDVP and 30% of mixture B defined below:

Mixture B: paraffin oil:[a] 2 parts by weight; stearone:[b] 1 part by weight.

[a] Semi-refined product having a density of 0.870 at 15° C. and a viscosity of 1.7° Engler at 50° C.

[b] Technical product sold by the French company Produits Chimiques in Normandy, the head office of which is in Paris, which product has a solidification point of 75/76° C.

The three series thus prepared were suspended in a room in which the temperature was kept 20°±2° C. and in which the relative humidity was about 50.

After 21 days, the amounts in milligrams of DDVP which had evaporated into the atmosphere were the following, calculated as daily averages (the word "control" designates the series of double cardboards impregnated only with DDVP):

Control ______________________________ 610
I–A __________________________________ 440
I–B __________________________________ 430

After these 21 days, the amount of DDVP destroyed by hydrolysis was measured potentiometrically (it has been found, moreover, that the hydrolysis of DDVP under the conditions given above leads to the formation of a phosphoric acid ester, and that the potentiometric measurement of the sole acidity or the first acidity of that ester permits determination of the amount of DDVP which was hydrolyzed).

The acidity of the DDVP (0.4% of the equivalent weight of DDVP) was taken into account and was deducted from the results obtained.

The average amounts in percent of DDVP decomposed by hydrolysis which were recorded are given in the following table:

Control ______________________________ 31
I–A __________________________________ 0.3
I–B __________________________________ 0.8

EXPERIMENT II

Double cardboards such as those described in Experiment I were used, but they were divided into 2 new series II–A and II–B.

The double cardboards of series II–A were each impregnated with 25 g. of a formulation having a temperature of 75° C. and containing 60% by weight of DDVP and 40% of Mixture A defined above.

The double cardboards of series II–B were each impregnated with 25 g. of a formulation having a temperature of 75° C. and containing 60% by weight of DDVP and 40% of Mixture B defined above.

These two series were suspended in a room under the conditions described in Experiment I.

After 21 days, the amounts in milligrams of DDVP which had evaporated into the atmosphere were the following, calculated as the daily averages:

II–A _________________________________ 540
II–B _________________________________ 490

The average amounts in percent of DDVP destroyed by hydrolysis were measured as in Experiment I and recorded as follows in relation to the control given above:

Control ______________________________ 31
II–A _________________________________ 0.5
II–B _________________________________ 0.8

EXPERIMENT III

Double cardboards such as those described in Experiment I were used, but they were divided into 5 new series III–A to III–E.

The double cardboards of series III-A were each impregnated with 25 g. of a formulation having a temperature of 75° C. and containing 50% by weight of DDVP and 50% of Mixture A defined above.

The double cardboards of series III-B were each impregnated with 25 g. of a formulation having a temperature of 75° C. and containing 50% by weight of DDVP and 50% of Mixture B defined above.

The double cardboards of series III-C, III-D and III-E were each, respectively, impregnated with 25 g. of one of the 3 formulations having a temperature of 75° C. and containing 50% by weight of DDVP, and 50% of one of the 3 mixtures C, D and E following:

Mixture C: paraffin oil [a]: 1 part by weight; sterone [b]: 1 part by weight.

Mixture D paraffin oil [a] 1 part by weight; sterone [b]: 2 parts by weight.

Mixture E: paraffin oil [a]: 1 part by weight; stearone [b]: 3 parts by weight.

[a] Semi-refined product having a density of 0.870 at 15° C. and a viscosity of 1.7° Engler at 50° C.
[b] Technical product sold by the French company Produits Chimiques in Normandy, the head office of which is in Paris, which product has a solidification point of 75–76° C.

These 5 series were suspended in a room under the conditions described in Experiment I.

After 21 days, the amounts in milligrams of DDVP evaporated into the atmosphere were the following, calculated as the daily averages:

III-A ________________________________________ 450
III-B ________________________________________ 410
III-C ________________________________________ 350
III-D ________________________________________ 310
III-E ________________________________________ 260

The average amounts in percent of DDVP destroyed by hydrolysis were measured as in Experiment I and recorded as follows in relation to the control given above:

Control ______________________________________ 31
III-A ________________________________________ 0.7
III-B ________________________________________ 0.7
III-C ________________________________________ 0.8
III-D ________________________________________ 0.7
III-E ________________________________________ 1.0

EXPERIMENT IV

Double cardboards such as those described in Experiment I were used, but the cardboards consisted of cellulose sold by the French company called Fioroni Establishment, under the reference number 200 and having a density of about 1000 g. per square meter; each cardboard had a size of 5 x 10 cm.

Each double cardboard was dried in an oven at 110° C. and impregnated with the following mixture IV-A at a temperature of 75° C.:

DDVP, technical: 6.25 g.
Vaseline oil [d]: 4.70 g.
Stearone [b]: 1.55 g.

[b] Technical product sold by the French company Produits Chimiques in Normandy, the head office of which is in Paris, which product has a solidification point of 75–76° C.
[d] Semi-refined oil having a density of 0.867 at 15° C. and a freezing point of about −42° C.

Another series of double cardboards was impregnated just with DDVP to serve as a control.

The cardboards thus impregnated were placed in bags made of "nylon 66" cloth having a thread of 0.14 mm. and a mesh of 0.3 mm. manufactured by the French company Tripette and Renaud.

These devices were suspended in a room the temperature of which was kept at 22±2° C. and the relative humidity was about 70.

After 38 days, the average amounts in percent of DDVP destroyed by hydrolysis were measured as in Experiment I and recorded as follows:

Control ______________________________________ 45.6
IV-A _________________________________________ 0.9

EXPERIMENT V

Double cardboards such as those described in Experiment I were used, but they were divided into 4 series V-A to V-D and a control series.

The double cardboards of the control series were each impregnated with 20 g. of DDVP.

The double cardboards of the series V-A to V-D were each respectively impregnated with 20 g. of one of the following formulations at a temperature of 65° C.:

|  | V-A | V-B | V-C | V-D |
|---|---|---|---|---|
| Component, percent: |  |  |  |  |
| DDVP | 29 | 26 | 22.7 | 20 |
| Paraffin oil [a] | 58 | 52 | 45.4 | 40 |
| Laurone [c] | 13 | 22 | 31.9 | 40 |

[a] Semi-refined product having a density of 0.870 at 15° C. and a viscosity of 1.7° Engler at 50° C.
[c] Technical product sold by the Norman Company Produits Chimiques cited above, having a melting point of 64–65° C. and consisting of a mixture of laurone (90–92%), myristone (7–9%), and caprinone (1%).

These 5 series were suspended in a room the temperature of which was kept at 20±2° C. and which had a relative humidity of about 60.

After 21 days, the amounts in milligrams of DDVP which had evaporated into the atmosphere were as follows, calculated as the daily averages:

Control ______________________________________ 490
V-A __________________________________________ 220
V-B __________________________________________ 205
V-C __________________________________________ 170
V-D __________________________________________ 140

The average amounts in percent of DDVP destroyed by hydrolysis were measured as in Experiment I and recorded as follows in relation to the control:

Control ______________________________________ 45
V-A __________________________________________ 0
V-B __________________________________________ 0.6
V-C __________________________________________ 0.8
V-D __________________________________________ 0.8

EXPERIMENT VI

Double cardboards such as those described in Experiment IV were used. These cardboards were divided into five series designated VI-A to VI-E plus a control series; the control cardboards were each impregnated with 12.5 g. of DDVP; the others were each impregnated with 12.5 g. of one of the following compositions (values are expressed in percent by weight):

|  | VI-A | VI-B | VI-C | VI-D | VI-E |
|---|---|---|---|---|---|
| DDVP | 51.8 | 62.5 | 53.7 | 55.5 | 52.1 |
| Paraffin oil [a] | 30.2 | 25.0 | 32.2 | 27.8 | 30.4 |
| Octanophenone | 18.0 |  |  |  |  |
| Decanophenone |  | 12.5 | 14.1 | 16.7 | 17.4 |

[a] Semi-refined product having a density of 0.870 at 15° C. and a viscosity of 1.7° Engler at 50° C.

NOTE.—Impregnation carried out at ambient temperature (20° C.).

After being enclosed in bags as described in Experiment IV, the impregnated cardboards were suspended in a room the temperature of which was kept at 22±2° C. and the relative humidity was about 70.

After one month, the amounts of DDVP destroyed were measured in percent as described in Experiment I and recorded as follows:

Control ______________________________________ 55.1
VI-A _________________________________________ 0
VI-B _________________________________________ 0
VI-C _________________________________________ 0
VI-D _________________________________________ 0
VI-E _________________________________________ 0.1

EXPERIMENT VII 10 x 10 cm. squares cut from a cellulose cardboard sold by the company Fioroni S.A. under the number 200 were used. At the time of use, this cardboard weighed 880 grams per square meter.

The cardboard squares were separated into four series designated VII-A to V-D plus a control series; the control cardboards were each impregnated with 14.2 g. of DDVP; the other cardboards were each impregnated with 14.2 g. of one of the following compositions (values are expressed in percent by weight).

|  | VII-A | VII-B | VII-C | VII-D |
|---|---|---|---|---|
| DDVP | 57.4 | 53.7 | 40.0 | 25.1 |
| Paraffin oil <sup>a</sup> | 38.3 | 35.8 | 26.7 | 16.7 |
| Propiophenone | 4.3 | | 33.3 | |
| Acetophenone | | 10.5 | | 58.2 |
| Temperature in ° C | 65 | 65 | 25 | 25 |

<sup>a</sup> Semi-refined product having a density of 0.870 at 15° C. and a viscosity of 1.7° Engler at 50° C.

The cardboards thus impregnated were placed in bags made of "nylon 66" cloth having a thread of 0.14 mm. and a mesh of 0.3 mm. manufactured by the French company Tripette and Renaud, and then suspended in a room the temperature of which was kept at 22±2° C. and the relative humidity was about 60.

After 10, 20 and 30 days, the amounts of DDVP destroyed by hydrolysis were measured as described in Experiment I and recorded as follows (values are expressed in percent by weight):

|  | 10 days | 20 days | 30 days |
|---|---|---|---|
| Control | 39.5 | 47.2 | 52.1 |
| VII-A | 0.4 | 2.7 | 4.4 |
| VII-B | 0.4 | 0.9 | 1.5 |
| VII-C | 0.4 | 0.6 | 1.6 |
| VII-D | 0 | 0.2 | 0.2 |

EXPERIMENT VIII

Double cardboards such as those described in Experiment IV were used, but they were not put into bags. These cardboards were divided into eight series designated VIII-A to VIII-H plus a control series; the control cardboards were each impregnated with 12.5 g. of DDVP; the others were each impregnated with 12.5 g. of one of the following compositions (values are expressed in percent by weight):

|  | VIII-A | VIII-B | VIII-C | VIII-D | VIII-E | VIII-F | VIII-G | VIII-H |
|---|---|---|---|---|---|---|---|---|
| DDVP | 47.0 | 47.5 | 50.0 | 50.0 | 62.0 | 65.0 | 73.7 | 74.4 |
| Paraffin oil <sup>a</sup> | 11.8 | 20.2 | 37.5 | 37.5 | 26.5 | 27.8 | 18.4 | 18.6 |
| 1-chloro-hexadecane | | 32.3 | | 12.5 | | 7.2 | | 7.0 |
| 1-chloro-octadecane | 41.2 | | 12.5 | | 11.5 | | 7.9 | |
| Temperature in ° C | 25 | 25 | 80 | 50 | 60 | 60 | 60 | 60 |

<sup>a</sup> Semi-refined product having a density of 0.870 at 15° C. and a viscosity of 1.7° Engler at 50° C.

The cardboards thus impregnated were suspended in a room the temperature of which was kept at 22±2° C. and the relative humidity was about 70.

After one month, the amounts of DDVP destroyed were measured in percent as described in Experiment I and recorded as follows:

| | |
|---|---|
| Control | 45.6 |
| VIII-A | 0 |
| VIII-B | 0 |
| VIII-C | 0 |
| VIII-D | 0 |
| VIII-E | 0 |
| VIII-F | 0 |
| VIII-G | 0 |
| VIII-H | 0.1 |

EXPERIMENT IX

Double cardboards such as those described in Experiment IV were used, but they weighed 895 g./m.². These cardboards were divided into three series designated IX-A to IX-C plus a control series; the control cardboards were each impregnated with 12.5 g. of DDVP; the others were each impregnated with 12.5 g. of one of the following compositions (values are expressed in percent by weight):

|  | IX-A | IX-B | IX-C |
|---|---|---|---|
| DDVP | 50.6 | 56.5 | 61.9 |
| Paraffin oil <sup>a</sup> | 21.7 | 24.3 | 26.5 |
| 1-chloro-hexadecane | | 19.2 | |
| 1-chloro-octadecane | 27.7 | | 11.6 |
| Temperature in ° C | 40 | 40 | 60 |

<sup>a</sup> Semi-refined product having a density of 0.870 at 15° C. and a viscosity of 1.7° Engler at 50° C.

The cardboards thus impregnated, after each being placed in a bag, were suspended in a room the temperature of which was kept at 22±2° C. and the relative humidity was about 70.

After one month, the amounts of DDVP destroyed were measured in percent as described in Experiment I and recorded as follows:

| | |
|---|---|
| Control | 55.1 |
| IX-A | 0 |
| IX-B | 0 |
| IX-C | 0 |

EXPERIMENT X

Double cardboards such as those described in Experiment VIII were used, but they weighed 900 g./m.². These cardboards were divided into five series designated X-A to X-E plus a control series; the control cardboards were each impregnated with 12.5 g. of DDVP; the others were each impregnated with 12.5 g. of one of the following compositions (values are expressed in percent by weight):

|  | X-A | X-B | X-C | X-D | X-E |
|---|---|---|---|---|---|
| DDVP | 56 | 50 | 50 | 53 | 56 |
| Octadecane | 33 | | | 31 | |
| Eicosane | | 30 | 30 | | 33 |
| Dioctyl phthalate | 11 | | | | |
| 1-chloro-hexadecane | | 20 | | | |
| Phenoxy benzene | | | 20 | | |
| Stilbene (trans) | | | | 16 | |
| Laurophenone | | | | | 11 |
| Temperature in ° C | 70 | 70 | 65 | 70 | 60 |

The cardboards thus impregnated were suspended in a room the temperature of which was kept at 22±2° C. and the relative humidity was about 75.

After 15 days, the amounts of DDVP destroyed were mesured in percent as described in Experiment I and recorded as follows:

| | |
|---|---|
| Control | 51.0 |
| X-A | 0.1 |
| X-B | 0.15 |
| X-C | 0.2 |
| X-D | 0.3 |
| X-E | 0.2 |

EXPERIMENT XI

Double cardboards such as those described in Experiment VIII were used, but they weighed 895 g./m.². These cardboards were divided into seven series designated XI-A to XI-G plus a control series; the control cardboards were each impregnated with 12.5 g. of DDVP; the others were each impregnated with 12.5 g. of one of the following compositions (values are expressed in percent by weight):

|  | XI-A | XI-B | XI-C | XI-D | XI-E | XI-F | XI-G |
|---|---|---|---|---|---|---|---|
| DDVP | 53 | 59 | 51 | 59 | 60 | 59 | 50 |
| Paraffin oil [a] | 31 | 35 | 30.5 | 35 | 36 | 35 | 30 |
| Methyl laurate | 16 | | | | | | |
| Diphenyl-methane | | 6 | | | | | |
| Dioctyl adipate | | | 18.5 | | | | |
| Phenoxy benzene | | | | 6 | | | |
| Hexachloro-biphenyl [i] | | | | | 4 | | |
| Nonachloro-diphenyl-benzene [i'] | | | | | | 6 | |
| Diocytl phthalate | | | | | | | 20 |
| Temperature in °C | 20 | 60 | 20 | 60 | 60 | 60 | 60 |

[a] Semi-refined product having a density of 0.870 at 15° C. and a viscosity of 1.7° Engler at 50° C.
[i] Mixture of chlorinated biphenyls containing 60% chlorine, and having a boiling range of from 385 to 420° C., which is sold under the trademark "Arochlor-1260" by the American company Monsanto Co.
[i'] Mixture of chlorinated diphenyl benzenes containing 59.5% chlorine, and having a boiling range of from 280 to 335° C. at 5 torr, which is sold under the trademark "Arochlor-5460" by the same company.

The cardboards thus impregnated were suspended in a room the temperature of which was kept at 22±2° C. and the relative humidity was about 70.

After 15 days, the amounts of DDVP destroyed were measured in percent as described in Experiment I and recorded as follows:

Control _______________________ 47.0
XI-A __________________________ 0.1
XI-B __________________________ 0.15
XI-C __________________________ 0.1
XI-D __________________________ 0.3
XI-E __________________________ 0.25
XI-F __________________________ 0.3
XI-G __________________________ 0.15

EXPERIMENT XII

Double cardboards such as those described in Experiment VIII were used, but they weighed 900 g./m.². These cardboards were divided into eight series designated XII-A to XII-H plus a control series; the control cardboards were each impregnated with 12.5 g. of DDVP; the others were each impregnated with 12.5 g. of one of the following compositions (values are expressed in percent by weight):

The cardboards thus impregnated were suspended in a room the temperature of which was kept at 22±2° C. and the relative humidity was about 75.

After 15 days, the amounts of DDVP destroyed were measured in percent as described in Experiment I and recorded as follows:

Control _______________________ 51.4
XII-A _________________________ 0.1
XII-B _________________________ 0
XII-C _________________________ 0
XII-D _________________________ 0.2
XII-E _________________________ 0.2
XII-F _________________________ 0.1
XII-G _________________________ 0.1
XII-H _________________________ 0

EXPERIMENT XIII

Double cardboards such as those described in Experiment VIII were used, but they weighed 910 g./m.². These cardboards were divided into ten series designated XIII-A to XIII-J plus a control series; the control cardboards were each impregnated with 10 g. of DDVP; the other double cardboards were each impregnated with 10 g. of one of the following compositions (values are expressed in per cent by weight):

|  | XIII-A | XIII-B | XIII-C | XIII-D | XIII-E | XIII-F | XIII-G | XIII-H | XIII-I | XIII-J |
|---|---|---|---|---|---|---|---|---|---|---|
| DDVP | 50 | 50 | 50 | 50 | 50 | 50 | 50 | 50 | 50 | 50 |
| Paraffin oil [a] | 30 | 30 | 30 | 30 | 30 | 30 | 30 | 30 | 30 | 30 |
| Stearone [b] | 5 | 5 | 10 | 10 | 12 | 12 | | | | 5 |
| Dioctyl adipate | 15 | | | | | | 15 | | | 10 |
| Lauro-phenone | | 15 | | | | | | | | |
| Phenoxy-benzene | | | 10 | | | | | 10 | | |
| 1-chloro-hexadecane | | | | 10 | | | 5 | 10 | 10 | 5 |
| Hexachloro-biphenyl [i] | | | | | 8 | | | | | |
| Stilbene (trans) | | | | | | 8 | | | 10 | |
| Temperature in °C | 60 | 60 | 65 | 65 | 65 | 65 | 20 | 65 | 65 | 60 |

[a] Semi-refined product having a density of 0.870 at 15° C. and a viscosity of 1.7° Engler at 50° C.
[b] Technical product sold by the French company Produits Chimiques in Normandy, the head office of which is in Paris, which product has a solidification point of 75-76° C.
[i] Mixture of chlorinated biphenyls containing 60% chlorine, and having a boiling range of from 385 to 420° C., which is sold under the trademark "Arochlor-1260" by the American company Monsanto Co.

The cardboards thus impregnated were suspended in a room the temperature of which was kept at 22±2° C. and the relative humidity was about 80.

ing compositions (values are expressed in percent by weight):

|  | XII-A | XII-B | XII-C | XII-D | XII-E | XII-F | XII-G | XII-H |
|---|---|---|---|---|---|---|---|---|
| DDVP | 45.4 | 56 | 56 | 53 | 56 | 50 | 56 | 56 |
| Paraffin oil [a] | 27.3 | 33 | 33 | 31 | 33 | 30 | 33 | 33 |
| Oleone | 27.3 | | | | | | | |
| Octachlorobiphenyl [j] | | 11 | | | | | | |
| 3,4-dichloroacetophenone | | | 11 | | | | | |
| 4-tert-butyl-acetophenone | | | | 16 | | | | |
| 2,4-dimethoxy-acetophenone | | | | | 11 | | | |
| 1-bromo-dodecane | | | | | | 20 | | |
| 2-hendecanone | | | | | | | 11 | |
| 2-methyl-4-hendecanone | | | | | | | | 11 |
| Temperature in °C | 50 | 70 | 60 | 40 | 70 | 45 | 45 | 45 |

[a] Semi-refined product having a density of 0.870 at 15° C. and a viscosity of 1.7° Engler at 50° C.
[j] Mixture of octachloro-biphenyls having a softening point of 110±10° C., sold under the trademark "Electrophenyl 0" by the French company Electrochimie, Electrometallurgie et Acieries in Ugine.

After 15 days, the amounts of DDVP destroyed were measured in percent as described in Experiment I and recorded as follows:

Control _________________________________ 55.5
XIII–A __________________________________ 0.1
XIII–B __________________________________ 0.1
XIII–C __________________________________ 0.1
XIII–D __________________________________ 0.2
XIII–E __________________________________ 0.1
XIII–F __________________________________ 0.1
XIII–G __________________________________ 0.1
XIII–H __________________________________ 0.1
XIII–I __________________________________ 0.1
XIII–J __________________________________ 0.15

EXPERIMENT XIV

Cardboard squares such as those described in Experiment VII were used, which were separated into five series designated XIV–A to XIV–E plus a control series; the control cardboards were each impregnated with 12.5 g. of DDVP; the others were impregnated with 12.5 g. of one of the following compositions (values were expressed in percent by weight):

|  | XIV-A | XIV-B | XIV-C | XIV-D | XIV-E |
|---|---|---|---|---|---|
| DDVP | 25.4 | 24.3 | 25.0 | 23.3 | 26.9 |
| Paraffin 60–62° | 47.0 | 44.6 | 46.5 | 43.5 | 51.3 |
| Octachloro-biphenyl ʲ | 27.6 | | | | |
| Chlorinated polyphenyl ʲ' | | 31.1 | | | |
| Nonachloro-diphenyl-benzene ʲ' | | | 28.5 | | |
| Chlorinated biphenyls ʲ'' | | | | 33.2 | |
| Phenoxy-benzene | | | | | 21.8 |
| Temperature in ° C | 90 | 90 | 90 | 130 | 80 |

ʲ Mixture of octachloro-biphenyls having a softening point of 110±10° C., sold under the trademark "Electrophenyl 0" by the French company Electrochimie, Electrometallurgie et Acieries in Ugine.
ʲ' Mixture of chlorinated biphenyls and diphenyl benzenes containing 65% chlorine, and having a boiling range at 4 torr of from 230 to 320° C., which is sold under the trademark "Arochlor–4465" by the American company, Monsanto Co.
ʲ' Mixture of chlorinated diphenyl benzenes containing 59.5% chlorine, and having a boiling range of from 280 to 335° C. at 5 torr, which is sold under the trademark "Arochlor–5460" by the same company.
ʲ'' Mixture of strongly chlorinated biphenyls containing 68% chlorine, and having a boiling range of from 435 to 450° C., which is sold under the trademark "Arochlor–1268" by the same company.

The cardboards thus impregnated were suspended, open, in a room the temperature of which was kept at 20±2° C. and the relative humidity was about 70.

After 15 days, the amounts of DDVP destroyed were measured in percent as described in Experiment I and recorded as follows:

Control _________________________________ 30.2
XIV–A __________________________________ 0.1
XIV–B __________________________________ 0.1
XIV–C __________________________________ 0.1
XIV–D __________________________________ 0.2
XIV–E __________________________________ 0.2

EXPERIMENT XV

Cardboard squares such as those described in Experiment VII were used, which were separated into four series designated XV–A to XV–D, plus a control series; the control cardboards were each impregnated with 12.5 g. of DDVP; the others were impregnated with 12.5 g. of one of the following compositions (values are expressed in percent by weight):

|  | XV-A | XV-B | XV-C | XV-D |
|---|---|---|---|---|
| DDVP | 39 | 50 | 36 | 34 |
| Squalane | 22 | 30 | 22 | 20 |
| Stearone ᵇ | 39 | | | |
| Laurophenone | | 20 | | |
| 1-chloro-octadecane | | | 42 | |
| Hexachloro-biphenyl ⁱ | | | | 46 |
| Temperature in ° C | 80 | 70 | 70 | 70 |

ᵇ Technical product sold by the French company Produits Chimiques in Normandy, the head office of which is in Paris, which product has a solidification point of 75–76° C.
ⁱ Mixture of chlorinated biphenyls containing 60% chlorine, and having a boiling range of from 385 to 420° C., which is sold under the trademark "Arochlor–1260" by the American company Monsanto Co.

The cardboards thus impregnated were suspended, open, in a room the temperature of which was kept at 20±2° C. and the relative humidity was about 70.

After 15 days, the amounts of DDVP destroyed were measured in percent as described in Expermient I and recorded as follows:

Control _________________________________ 30.2
XV–A __________________________________ 0.5
XV–B __________________________________ 0.1
XV–C __________________________________ 0.1
XV–D __________________________________ 0

EXPERIMENT XVI

At a temperature at which the ingredients are miscible, the following components are mixed together to form five compositions designated XVI–A to XVI–E (values are expressed in grams):

|  | XVI-A | XVI-B | XVI-C | XVI-D | XVI-E |
|---|---|---|---|---|---|
| DDVP | 7.0 | 7.0 | 7.0 | 7.0 | 7.0 |
| Paraffin 60–62° | 13.0 | 13.0 | 13.0 | 13.0 | 13.0 |
| Durene | 6.3 | | | | |
| Octachloro-biphenyl ʲ | | 7.5 | | | |
| Chlorinated polyphenyls ʲ' | | | 8.8 | | |
| Nonachloro-diphenylbenzene ʲ' | | | | 8.0 | |
| Chlorinated biphenyls ʲ'' | | | | | 10.0 |
| Temperature in ° C | 80 | 90 | 90 | 90 | 135 |

ʲ Mixture of octachloro-biphenyls having a softening point of 110±10° C. sold under the trademark "Electrophenyl 0" by the French company Electrochimie, Electrometallurgie et Acieries in Ugine.
ʲ' Mixture of chlorinated biphenyls and diphenyl benzenes containing 65% chlorine, and having a boiling range at 4 torr of from 230 to 320° C., which is sold under the trademark "Arochlor–4465" by the American company Monsanto Co.
ʲ' Mixture of chlorinated diphenyl benzenes containing 59.5% chlorine, and having a boiling range of from 280 to 335° C. at 5 torr, which is sold under the trademark "Arochlor–5460" by the same company.
ʲ'' Mixture of strongly chlorinated biphenyls containing 68% chlorine, and having a boiling range of from 435 to 450° C., which is sold under the trademark "Arochlor–1268" by the same company.

These mixtures were each poured into a cylindrical, aluminum mold having a diameter of 28 millimeters; a small metal hook was placed in the center of each composition to permit suspension. After cooling and solidification, the compositions were removed from the molds and suspended in a room the temperature of which was kept at 20±2° C. and having a humidity of about 70.

After 24 days, the amounts of DDVP destroyed were measured as described in Experiment I and found to be zero in each of the compositions.

The results of the preceding experiments show to what extent DDVP is vulnerable in the presence of atmospheric humidity when it is unprotected; they also show that in the compositions contemplated by the invention. DDVP was well protected against the destructive action of humidity, since the decomposition recorded for these compositions was either zero or very much less than when the DDVP was unprotected.

EXPERIMENT XVII

Double cardboards in bags as described for number IV-A in Experiment IV were used.

These devices were suspended in a room in which the temperature was kept at 22±2° C. and having a relative humidity of 65±5.

After 24 hours and then every 7 days, the devices were weighed to determined the amount of DDVP which had evaporated; at the same time tests were carried out under the following conditions to determine their insecticidal value:

Flies are released in a room of 30 cubic meters, the moment that the device has been put in place, while maintaining the temperature at 25° C. The time, expressed in minutes, necessary to obtain a knock down of 50% of the flies (KD 50) is noted as well as the percentage of flies knocked down at the end of one hour (KD percent).

The averages of these results, calculated on 30 test devices, are given in the following table:

|  | Evaporation (in mg.) | KD 50 (in min.) | KD, percent (in 1 hr.) |
| --- | --- | --- | --- |
| 1st day | 135 | 36±2 | 98±2 |
| 8th day | 123 | 38±2 | 97±3 |
| 16th day | 112 | 40±3 | 96±4 |
| 22nd day | 103 | 40±3 | 93±5 |
| 29th day | 94 | 42±3 | 88±7 |
| 36th day | 86 | 44±3 | 83±7 |
| 43rd day | 79 | 47±4 | 75±8 |
| 50th day | 73 | 50±4 | 63±10 |

After 50 days, the total average amount of DDVP released into the atmosphere was 4.42 g., i.e., 71% of the DDVP involved.

This experiment shows the advantage of compositions according to the invention in the embodiment of insecticidal evaporators, permitting the obtention of a lasting effectiveness during at least 7 weeks with as little an amount of active ingredient as 6.25 g. of technical DDVP.

EXPERIMENT XVIII 10 x 10 cm. squares cut from a cardboard felt sold by the French company Mulner & Joncquez under the reference No. J-2-A-60 were used; these quares were each impregnated with 14 g. of a formulation of the following composition and maintained at 70° C.:

DDVP, teachnical =70%
Vaseline oil$^d$=22.5%
Stearone$^b$=7.5%

The squares thus impregnated were divided into groups of 2 and placed sandwich-like between two sheets of the same dimensions, cut from a cardboard one surface of which is coated with a 23-micron layer of low density polyethylene (d.=0.92) manufactured by the French company Papiethylene; the coated surface facing outwardly. The edges of the whole being hermetically sealed by a polyethylene frame consisting of two pieces which have been soldered together.

The evaporator devices thus obtained were placed in a room in which the temperature was kept at 22±2° C. and the relative humidity was 65±5. The devices were weighed regularly; an evaporation in the vicinity of 120±20 mg. during the whole duration of the first month was thus observed; at the end of two months, the evaporation was still 90±20 mg.

This experiment shows that the compositions according to the invention are fully suitable for use with a permeable membrane used to regulate the release of the active ingredient.

In the preceding experiments cardboard sheets were used as support for the compositions according to the invention; of course this type of support is not the only possible application of the invention.

Figure 1:
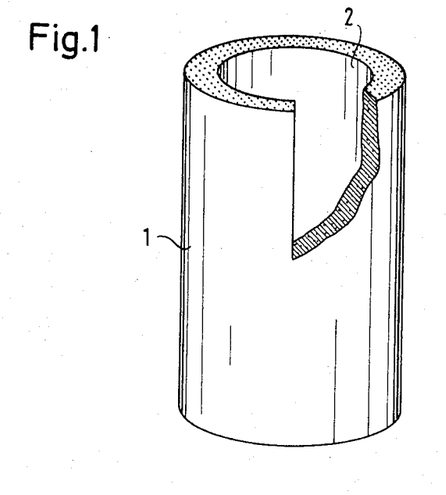
Figure 2:
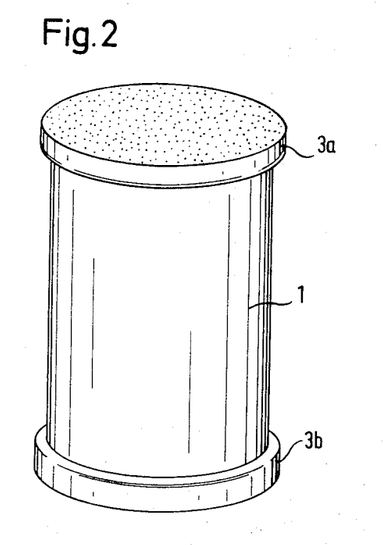

FIG. 1 represents, for example, a device in which the support 1 is a cylinder comprising a central hollow part 2 and consists of a cellulose paste which has been dried after compression; the cylinder is impregnated with one of the compositions according to the invention by soaking it, for example, in the composition which is in a liquid state; this operation may be carried out under vacuum in order to expel the air contained in the cylinder; the liquid composition may also be injected into the mass of the cylinder using one or more needles inserted in said mass. The cylinder thus impregnated may be provided with two polyethylene covers 3a and 3b by forcing-fitting on the cylinder as in FIG. 2 or fastened as described Luxembourg Pat. No. 57,812, issued to the applicant on May 13, 1969.

EXPERIMENT XIX

Three series of 4 solid blocks were prepared having the composition given below and designated XIX-A, XIX-B and XIX-C.

|  | XIX-A | XIX-B | XIX-C |
| --- | --- | --- | --- |
| DDVP | 25 | 25 | 25 |
| Paraffin 60-62 | 96.5 | 51.5 | 48.5 |
| Diphenyl-methane | | 20 | |
| Phenoxy-benzene | | | 20 |
| Alugel 44 DM $^k$ | 5 | 3 | 6 |
| Irgalite Yellow BAW $^l$ | 0.5 | 0.5 | 0.5 |

$^k$ Mixture comprising 80% by weight of aluminum distearate and 20% by weight of aluminum monostearate, which is sold by the German company Barlocher.
$^l$ Pigment given in the Color Index under the number 21,100 and the name Pigment Yellow 13.

These blocks were obtained in the following manner: the paraffin and in Experiments XIX-B and XIX-C the incorporating agents are heated with continual agitation to a temperature of 70° C.; when the mixture has melted the Alugel 44 DM is added; while agitation is maintained, heating is regulated at a rate of 1° C. a minute until a temperature of 92° C.±5° C. is attained; the mixture obtained is then rapidly cooled; when the mixture has attained a temperature of 85° C., the DDVP is poured in and the dyestuff is added; when the mixture has attained a temperature of 75° C., it is poured into stainless steel molds having the form of a hollow cylinder; as soon as the temperature of the mass in the molds, in contact with the surrounding air, has fallen to about 20° C., the hollow cylindrical blocks are removed from the molds.

The blocks obtained have the following dimensions:

height of the cylinder: 10 cm.
exterior diameter of the base: 4.5 cm.
diameter of the cavity: 2.0 cm.

Each block weighs about 100 g.

The four blocks of each series were suspended in a ventilated room in which the temperature was kept at 22±2° C. and the relative humidity was 65±5.

The blocks were weighed at regular intervals, and every 30 days one block from each of the series XIX–A, XIX–B and XIX–C was taken and analyzed to determine:

The amount of DDVP remaining in the composition;
The amount of DDVP which had hydrolyzed (acidity rate);
The amount of incorporating agent.

These determinations were made by the methods known as gas phase chromatography, or by potentiometric titrimetry after extracting the components to be analyzed, and by elementary analysis of the phosphorus and the chlorine.

In the following table, two compositions according to the instant invention (XIX–B and XIX–C) are compared with a composition (XIX–A) not containing any incorporating agent:

|  | XIX-A | | | XIX-B | | | XIX-C | | |
|---|---|---|---|---|---|---|---|---|---|
| Days | 30 | 60 | 90 | 30 | 60 | 90 | 30 | 60 | 90 |
| Total loss of weight of the block, g | 1.5 | 2.5 | 3 | 8.4 | 16.7 | 26.4 | 6 | 12 | 17 |
| Amount of DDVP evaporated, g | 1.5 | 2.5 | 3 | 4.0 | 8.4 | 12.5 | 3.2 | 6.5 | 10.3 |
| Daily average evaporation of DDVP, mg | 50 | 33 | 16.5 | 130 | 147 | 137 | 107 | 110 | 127 |
| Yield after 3 months' use calculated on the DDVP, percent | | 12 | | | 50 | | | 41 | |

This experiment shows that the compositions according to the instant invention, compared with previously known evaporater blocks, have:

An adequate evaporation of DDVP over a much longer period,
A more regular rate of evaporation during the entire period of use, and
A better yield of DDVP.

EXPERIMENT XX

Two series of 4 solid blocks were prepared having the composition given below and designated XX–A and XX–B:

|  | XX-A | XX-B |
|---|---|---|
| DDVP | 25 | 25 |
| Paraffin 60–62° C | 65.5 | 49.5 |
| Diphenyl-methane | | 20 |
| Bentone 38 ᵐ | 9 | 4 |
| Irgalite Yellow BAW [1] | 0.5 | 0.5 |

[1] Pigment given in the Color Index under the number 21,100 and the name Pigment Yellow 13.
ᵐ Ammonium salt of dimethyl-dialkyl-montmorillonite wherein the alkyl moiety comprises an average of 17 carbon atoms, sold by the National Lead Company.

These blocks were obtained in the following manner: a first container, which has a capacity large enough for the total composition, is charged with the DDVP, the incorporating agent, the Bentone 38, the dyestuff and one tenth of the total quantity of the paraffin; this mixture is heated with agitation to a temperature of 80° C.; in a second container, the rest of the paraffin is heated also with agitation to a temperature of 80° C.; the total contents of the second container is then slowly poured with agitation into the first container and then the mixture is poured at a temperature of 80°±5° C. into the hollow, cylindrical molds described in Experiment XIX; as soon as the temperature of the mass in the molds has fallen, in contact with the surrounding air, to about 20° C., the hollow cylindrical blocks are removed from the molds.

These blocks have the same dimensions and weight as the blocks described in Experiment XIX.

The amounts of non-decomposed DDVP given off, the amount of acidity caused by the hydrolysis of DDVP as well as the amount of diphenyl-methane was determined in the same manner as in Experiment XIX.

The results obtained are listed in the following table:

|  | XX-A | | | XX-B | | |
|---|---|---|---|---|---|---|
| Days | 30 | 60 | 90 | 30 | 60 | 90 |
| Total weight loss of the block, g | 6 | 7.5 | 8.1 | 7.7 | 13.0 | 19.5 |
| Amount of DDVP evaporated, g | 6 | 7.5 | 8.1 | 3.5 | 7.2 | 13.6 |
| Daily average evaporation of DDVP, mg | 200 | 50 | 16.5 | 116 | 123 | 213 |
| Yield after 3 months' use calculated on the DDVP, percent | | 32.4 | | | 45 | |
| Percent of DDVP which hydrolyzed | | | 4.6 | | | 2.5 |

This experiment confirms the results of Experiment XIX and shows that in a solid formulation according to the instant invention, the DDVP is better protected against decomposition by hydrolysis than a composition which does not contain any incorporating agent.

EXPERIMENT XXI

A hollow cylindrical block made of cellulose paste, having a height of 80 mm., an exterior diameter of 42 mm., and an interior diameter of 20 mm. is used; the weight of the block dried in an oven was about 50 grams, then having a density of about 0.58.

After drying, the block was impregnated with 60 g. of a composition composed as follows and kept at a temperature of 75° C.:

DDVP: 50.0%
Vaseline oil$^d$: 36.7%
Stearone$^b$: 12.3%
Azobenzene: 1.0%

After cooling, the side surface of the impregnated block was covered with a cloth of "nylon 66" having a thread of 0.14 mm. and a mesh of 0.3 mm. manufactured by the French company Tripette and Renaud; each end of the block was provided with a polyethylene cover which joined tightly with the cloth on the block.

The device thus obtained was placed in a room in which the temperature was kept at 22±2° C. and the relative humidity increased from 50 to 60.

After 24 hours, and then every seven days, the device was weighed to determine the amount of DDVP which evaporated; the resultant values are given below in milligrams/day:

1st day, 490
8th day, 440
15th day 380
2nd day, 335
29th day, 295
36th day, 260
43rd day, 230
50th day, 205
57th day, 180
64th day, 160
71st day, 140
78th day, 125
85th day, 110
92nd day, 95
99th day, 85

On the one hundredth day, the amount of DDVP released into the atmosphere was 21.2 g., i.e. 71% of the DDVP involved; the analysis shows that the amount of DDVP destroyed by hydrolysis was only 5.3% of the amount involved.

Several formulations are described below to illustrate the invention and are not intended to limit in any way.

EXAMPLES 1 TO 10

Hydrophobic insecticidal compositions comprising DDVP as active ingredient, a Vaseline oil or paraffin oil as higher alkanes, caprinone or 2-nonadecanone as incorporating agent, and in some cases epoxidized soyabean oil or a diazene as supplementary stabilizers (values are expressed in percent by weight).

TABLE I

|  | 1 | 2 | 3 | 4 | 5 | 6 | 7 | 8 | 9 | 10 |
|---|---|---|---|---|---|---|---|---|---|---|
| DDVP | 70.0 | 60.0 | 50.0 | 60.0 | 60.0 | 48.0 | 48.0 | 60.0 | 60.0 | 50.0 |
| Vaseline oil [d] | 23.0 | 30.0 | 37.0 |  |  |  |  | 33.5 | 27.0 |  |
| Paraffin oil [a] |  |  |  | 27.0 | 25.0 | 35.0 |  |  |  | 26.5 | 34.5 |
| Caprinone | 7.0 | 10.0 | 13.0 | 12.9 |  | 15.0 |  | 9.0 | 13.0 | 15.0 |
| 2-nonadecanone |  |  |  |  | 15.0 |  | 14.5 |  |  |  |
| Epoxidized soyabean oil |  |  |  |  |  |  | 4.0 |  |  |  |
| Diazene I [c] |  |  |  |  |  | 2.0 | 3.0 |  |  | 0.5 |
| Diazene II [f] |  |  |  | 0.1 |  |  | 1.0 |  | 0.5 |  |

[d] Semi-refined oil product having a density equal to 0.867 at 15° C. and a congealing point of about −42° C.
[a] Semi-refined product having a density of 0.870 at 15° C. and a viscosity of 1.7° Engler at 50° C.
[c] Compound known as azobenzene;
[f] (1:2) chromium complexes, in mixture, of the following azo compounds: 1-(2-hydroxy-5-nitrophenylazo)-2-naphthol, sodium salt (0.4 mol), 1-(2-hydroxy-4-nitrophenylazo)-2-naphthol, sodium salt (0.3 mol), 1-(2-hydroxy-3-nitro-5-tert-amylphenylazo)-2-naphthol, sodium salt (0.3 mol).

EXAMPLES 11 TO 20

Hydrophobic insecticidal compositions comprising DDVP as active ingredient, a Vaseline oil or paraffin oil as higher alkanes, laurone or myristone as incorporating agent and in some cases epoxidzed soyabean oil and/or a diazene as supplementary stabilizers (values are expressed in percent by weight).

TABLE II

|  | 11 | 12 | 13 | 14 | 15 | 16 | 17 | 18 | 19 | 20 |
|---|---|---|---|---|---|---|---|---|---|---|
| DDVP | 50.0 | 50.0 | 59.8 | 75.0 | 88.0 | 23.0 | 75.0 | 86.0 | 87.0 | 50.0 |
| Vaseline oil [d] |  | 35.0 |  |  |  |  | 15.0 |  |  |  |
| Paraffin oil [a] | 37.0 |  | 30.0 | 18.0 | 8.5 | 65.8 |  | 7.5 | 8.5 | 36.5 |
| Laurone [e] | 13.0 | 15.0 | 10.0 | 7.0 | 3.5 | 11.2 |  | 3.0 | 3.5 | 13.0 |
| Myristone |  |  |  |  |  |  | 10.0 |  |  |  |
| Epoxidized soyabean oil |  |  |  |  |  |  |  | 3.0 |  |  |
| Diazene I [c] |  |  |  |  |  |  |  |  |  | 0.5 |
| Diazene II [f] |  |  |  | 0.2 |  |  |  | 0.5 | 1.0 |  |

[d], [a], [c], [f] See footnotes at bottom of Table I.
[e] Technical product sold by the Norman Company Produits Chimiques having a melting point of 64–65° C. and consisting of a mixture of laurone (90–92%), myristone (7–9%), and caprinone (1%).

EXAMPLES 21 TO 30

Hydrophobic insecticidal compositions comprising DDVP as active ingredient, a Vaseline oil or paraffin oil as higher alkanes, palmitone or stearone as incorporating agent, and in some cases a stabilizer selected from epoxy compounds, benzodioxoles, and diazenes (values are expressed in percent by weight).

TABLE III

|  | 21 | 22 | 23 | 24 | 25 | 26 | 27 | 28 | 29 |
|---|---|---|---|---|---|---|---|---|---|
| DDVP | 40.0 | 82.4 | 65.0 | 40.0 | 65.0 | 65.0 | 40.0 | 59.0 | 60.0 |
| Vaseline oil [d] |  |  |  |  | 25.0 | 26.0 |  |  |  |
| Paraffin oil [a] | 49.5 | 15.6 | 26.0 | 50.0 |  |  | 49.0 | 26.0 | 27.0 |
| Palmitone |  |  |  |  | 10.0 |  | 9.0 |  |  |
| Stearone [b] | 10.5 | 2.0 | 9.0 |  | 10.0 |  |  | 10.5 | 9.5 | 10.0 |
| Octyl epoxystearate |  |  |  |  |  |  |  | 5.0 | 3.0 |
| Safrole |  |  |  |  |  |  |  |  |  |
| Diazene I [c] |  |  |  |  |  |  | 0.5 |  |  |
| Diazene III [n1] |  |  |  |  |  |  |  | 0.5 |  |
| Diazene IX [n] |  |  |  |  |  |  |  |  |  |

[d], [a], [c] See footnotes at bottom of Table I.
[b] Technical product sold by the French company Produits Chimiques n Normandy, the head office of which is in Paris, which product has a solidification point of 75–76° C.
[n] 1-(4-methyl-2-nitro-phenylazo) - 3 - ethoxycarbonyl-4,4-dimethyl-2,6-dioxocyclohexane.
[n1] (1:2) cobalt complex, in equimolar mixture, of diazo 2-amino-4-ethylsulphonyl-phenol→2-(N-methoxy-carbonyl-N-methylamino)-7-naphthol, sodium salt and diazo 2-amino-4-ethyslulphonyl-phenol→2-naphthol, sodium salt.

EXAMPLES 31 TO 40

Hydrophobic insecticidal compositions comprising DDVP as active ingredient, an ordinary paraffin as higher alkane, laurone or myristone as incorporating agent, and in some cases octyl epoxystearate or a diazene as supplementary stabilizer (values are expressed in percent by weight).

TABLE IV

|  | 31 | 32 | 33 | 34 | 35 | 36 | 37 | 38 | 39 | 40 |
|---|---|---|---|---|---|---|---|---|---|---|
| DDVP | 6.9 | 8.2 | 12.7 | 20.7 | 18.2 | 14.6 | 20.6 | 20.7 | 20.7 | 18.0 |
| Ordinary paraffin 60–62° | 70.4 | 72.1 | 68.6 | 55.2 | 58.2 |  | 54.2 | 54.9 | 55.0 | 57.6 |
| Ordinary paraffin 52–54° |  |  |  |  |  | 66.2 |  |  |  |  |
| Laurone [e] | 22.7 | 19.7 | 18.7 | 24.1 |  | 19.2 | 24.0 | 24.1 | 24.1 |  |
| Myristone |  |  |  |  | 23.6 |  |  |  |  | 23.0 |
| Cyclohexyl epoxystearate |  |  |  |  |  |  | 1.0 |  |  | 0.8 |
| Diazene III [n1] |  |  |  |  |  |  |  | 0.2 | 0.3 |  |
| Diazene IV [n2] |  |  |  |  |  |  |  |  | 0.2 | 0.2 |

[e] See footnotes at bottom of Table II.
[n1] See footnotes at bottom of Table III.
[n2] 1-(4-phenylazo-phenylhydrazono)-1,2-dihydro-2-oxonaphthalene, compound resulting from the coupling of β-naphthol and the diazotation product of 4-aminoazobenzene; this compound is often designated as 1-(4-phenylazo-phenylazo)-2-naphthol corresponding to its azo form.

EXAMPLES 41 TO 50

Hydrophobic insecticidal compositions comprising DDVP as active ingredient, mixtures of Vaseline, petrolatum or paraffin with a paraffin oil as higher alkanes, laurone or myristone as incorporating agent, and in some cases octyl epoxystearate or a diazene as supplementary stabilizer (values are expressed in percent by weight).

TABLE V

|  | 41 | 42 | 43 | 44 | 45 | 46 | 47 | 48 | 49 | 50 |
|---|---|---|---|---|---|---|---|---|---|---|
| DDVP | 78.6 | 38.6 | 78.6 | 79.1 | 32.8 | 79.0 | 78.5 | 77.1 | 78.0 | 78.2 |
| Paraffin oil a | 10.5 | 32.4 | 10.1 | 12.6 | 38.4 | 12.2 | 11.4 | 10.3 | 10.4 | 10.5 |
| Vaseline p | 3.5 | 10.8 | 3.4 |  |  |  | 3.8 | 3.4 | 3.5 | 3.5 |
| Petrolatum q |  |  |  |  |  |  | 3.8 |  |  |  |
| Ordinary paraffin 60-62° |  |  |  | 4.2 | 12.5 | 4.1 |  |  |  |  |
| Laurone e | 7.4 | 18.2 |  | 4.1 | 16.0 |  |  | 6.3 | 7.2 | 7.3 | 7.3 |
| Myristone |  |  | 7.9 |  |  | 4.7 |  |  |  |  |
| Epichlorohydrin |  |  |  |  |  |  | 2.0 |  |  |  |
| Diazene I o |  |  |  |  |  |  |  |  | 0.5 |  |
| Diazene III n1 |  |  |  |  |  | 0.3 |  |  |  |  |
| Diazene IV n2 |  |  |  |  |  |  |  |  | 0.3 | 0.5 | a, o See footnotes at bottom of Table I.
p Yellow-colored technical product having a dropping point above 47° C.
q Maroon-colored technical product having a dropping point of about 72° C.
e See footnotes at bottom of Table II.
n1 See footnotes at bottom of Table III.
n2 See footnotes at bottom of Table IV.

EXAMPLES 51 TO 60

Hydrophobic insecticidal compositions comprising DDVP as active ingredient, a Vaseline or a petrolatum as higher alkanes, stearone as incorporating agent, and in some cases octyl epoxystearate or a diazene as supplementary stabilizer (values are expressed in percent by weight).

TABLE VI

|  | 51 | 52 | 53 | 54 | 55 | 56 | 57 | 58 | 59 | 60 |
|---|---|---|---|---|---|---|---|---|---|---|
| DDVP | 33.0 | 27.0 | 28.0 | 33.0 | 32.5 | 33.0 | 33.0 | 27.0 | 28.0 | 27.0 |
| Vaseline p | 33.0 | 36.0 |  | 32.0 | 32.8 | 32.7 | 32.8 | 35.7 |  |  |
| Petrolatum q |  |  | 36.0 |  |  |  |  |  | 35.7 | 35.0 |
| Stearone b | 34.0 | 37.0 | 36.0 | 32.0 | 33.5 | 34.0 | 32.0 | 37.0 | 36.0 | 33.0 |
| Octyl epoxystearate |  |  |  |  |  |  | 2.0 |  |  | 5.0 |
| Diazene I o |  |  |  | 3.0 | 1.0 |  |  | 0.3 |  |  |
| Diazene III n1 |  |  |  |  | 0.2 | 0.3 | 0.2 |  | 0.3 |  | p, q See footnotes at bottom of Table V.
b, n1 See footnotes at bottom of Table III
o See footnotes at bottom of Table I.

EXAMPLES 61 TO 70

Hydrophobic insecticidal compositions comprising DDVP as active ingredient, a paraffin oil, a Vaseline or an ordinary paraffin as higher alkanes, laurone, stearone, dioctyl adipate and/or dimethyl succinate as incorporating agents, and, in some cases, a supplementary diluent and/or an inert filler and/or a stabilizer selected from the diazenes (values are expressed in percent by weight).

TABLE VII

|  | 61 | 62 | 63 | 64 | 65 | 66 | 67 | 68 | 69 | 70 |
|---|---|---|---|---|---|---|---|---|---|---|
| DDVP | 35.0 | 50.0 | 50.0 | 22.0 | 16.5 | 15.5 | 35.0 | 35.0 | 50.0 | 22.0 |
| Paraffine oil a | 26.0 | 12.0 | 10.0 |  |  |  | 36.0 | 36.0 | 12.0 |  |
| Vaseline p |  |  |  | 5.0 | 22.0 |  |  |  |  | 22.0 |
| Ordinary paraffin 60-62° |  |  |  |  | 41.5 | 41.5 |  |  |  |  |
| Laurone e | 9.0 |  | 5.0 |  | 16.1 | 16.1 | 12.0 | 12.0 |  |  |
| Stearone b |  | 12.0 | 10.0 | 23.0 |  |  |  |  | 12.0 | 23.0 |
| Dioctyl adipate |  | 15.0 |  |  |  |  |  |  | 9.0 |  |
| Dimethyl succinate |  |  | 18.0 |  |  |  |  |  |  | 6.0 |
| Dimethyl acetamide |  |  |  |  |  | 5.4 |  |  |  |  |
| Acetonitrile |  |  |  |  | 6.0 |  |  |  |  |  |
| 5, 8, 11-trioxapentadecane |  |  |  |  |  |  |  | 6.0 |  |  |
| Glass fibers |  |  |  | 31.0 |  | 5.0 |  |  |  | 21.9 |
| Fossil diatomaceous earth |  | 10.0 |  |  | 15.0 | 8.0 | 8.0 | 10.0 |  |  |
| Cellulosic fibers |  |  | 20.0 |  |  |  |  |  |  | 10.0 |
| Kaolin | 28.0 |  |  |  | 5.4 |  | 2.7 | 2.7 |  |  |
| Irgalite Yellow BAW i | 1.0 |  |  | 2.0 |  | 1.0 |  |  |  |  |
| Diazene I o | 1.0 | 0.5 | 0.8 |  | 1.0 | 0.5 |  |  | 1.0 | 1.0 |
| Diazene II f |  | 0.5 |  |  |  |  | 0.3 |  |  | 0.1 |
| Diazene IV n2 |  |  | 1.2 |  | 0.5 |  | 0.3 |  |  |  | a, o, f See footnotes at bottom of Table I.
p See footnotes at bottom of Table V.
e See footnotes at bottom of Table II
b See footnotes at bottom of Table III.
i Pigment given in the Color Index under the number 21,100 (Pigment Yellow 13).
n2 See footnotes at bottom of Table IV.
i Pigment given in Color Index under the number 21,100 (Pigment Yellow) 13.

EXAMPLES 71 TO 80

Hydrophobic insecticidal compositions comprising DDVP as active ingredient, a Vaseline oil or a paraffin oil as higher alkanes, an incorporating agent selected from phenoxy benzene, chlorinated diphenyl benzenes, diphenyl methane, 1,2-dibromo-benzene, stearone and 1-chloro-tetradecane, and in some cases, a stabilizer selected from the diazenes (values are expressed by weight).

EXAMPLES 91 TO 100

Hydrophobic insecticidal compositions comprising DDVP as active ingredient, a Vaseline oil or a paraffin oil as higher alkanes, an incorporating agent selected

TABLE VIII

|  | 71 | 72 | 73 | 74 | 75 | 76 | 77 | 78 | 79 | 80 |
|---|---|---|---|---|---|---|---|---|---|---|
| DDVP | 10.0 | 60.0 | 54.0 | 52.0 | 52.0 | 60.0 | 50.0 | 40.0 | 60.0 | 70.0 |
| Vaseline oil [d] | 19.8 |  |  | 29.0 | 27.8 | 25.0 | 20.3 |  |  | 6.0 |
| Paraffin oil [a] |  | 35.5 | 33.9 |  |  |  |  | 37.8 | 32.0 |  |
| Phenoxy-benzene | 68.2 |  |  |  |  | 8.2 |  | 14.7 | 6.2 |  |
| Nonachloro-diphenylbenzene [i'] |  | 4.0 |  |  |  |  | 7.1 |  | 16.0 | 3.1 | 6.2 |
| Diphenyl-methane |  |  | 12.1 |  |  |  |  |  | 4.9 |  |
| 1,2-dibromobenzene |  |  |  | 17.9 |  |  |  |  |  |  |
| Stearone [b] |  |  |  |  | 12.0 | 7.1 |  |  |  |  |
| 1-chloro-tetradecane |  |  |  |  |  |  |  | 5.0 |  | 17.8 |
| Diazene I [o] |  |  | 0.5 |  |  |  | 0.8 |  |  |  |
| Diazene IV [n₂] |  | 2.0 |  |  | 1.1 |  |  |  |  |  |

[d, a, o, f] See footnotes at bottom of Table I.
[i'] Mixture of chlorinated diphenyl benzenes containing 59.5% chlorine, and having a boiling range from of 280 to 335° C. at 5 torr, which is sold under the trademark "Arochlor-5460" by the same company.
[b] See footnotes at bottom of Table III.
[n₂] See footnotes at bottom of Table IV.

EXAMPLES 81 TO 90

Hydrophobic insecticidal compositions comprising DDVP as active ingredient, a Vaseline oil or a paraffin oil as higher alkanes, an incorporating agent selected from octanophenone, butyrophenone, p-methoxy-acetophenone, phenoxybenzene, 2-chloro-dodecane and dioctyl adipate, and in some cases a stabilizer selected from the diazenes (values are expressed in percent by weight).

TABLE X

|  | 91 | 92 | 93 | 94 | 95 | 96 | 97 | 98 | 99 | 100 |
|---|---|---|---|---|---|---|---|---|---|---|
| DDVP | 70.0 | 55.0 | 58.0 | 50.0 | 65.0 | 30.0 | 25.2 | 55.0 | 30.0 | 40.0 |
| Vaseline oil [d] | 15.2 | 26.7 |  |  | 19.0 |  | 34.8 |  |  | 40.4 |
| Paraffin oil [a] |  |  | 30.0 | 28.2 |  | 36.0 |  | 9.0 | 39.3 |  |
| Octanophenone | 14.8 |  |  |  | 9.8 | 12.3 | 15.0 |  |  | 13.8 |
| Butyrophenone |  | 17.3 |  |  |  |  |  |  | 12.7 |  |
| p-Methoxy-acetophenone |  |  | 12.0 | 20.1 | 5.2 |  |  | 5.3 |  |  |
| Phenoxybenzene |  |  |  |  |  | 21.7 |  | 17.6 |  |  |
| 2-chloro-dodecane |  |  |  |  |  |  | 25.0 | 12.4 |  |  |
| Dioctyl adipate |  |  |  |  |  |  |  |  | 17.2 | 5.8 |
| Diazene VI [n₄] |  |  |  | 1.0 |  | 0.4 |  |  | 0.8 |  |
| Diazene VII [n₅] |  |  |  | 1.7 | 0.6 |  |  | 0.7 |  |  |

[d, a] See footnotes at bottom of Table I.
[n₄] See footnotes at bottom of Table IX.
[n₅] 1-phenylhydrazono-1,2-dihydro-2-oxo-naphthalene, compound resulting from the coupling of β-naphthol and the diazotation product of aniline; this compound is often designated as 1-phenylazo-2-naphthol corresponding to its azo form.

from isopropyl myristate, glycol dibutyrate, 1-bromo-dodecane, 1 - chloro-hexadecane, 1 - chloro-octadecane, stearone, 4-vinylanisole, and chlorinated biphenyls, and in some cases a stabilizer selected from the oxiranes and the diazenes (values are expressed in percent by weight).

EXAMPLES 101 TO 110

Hydrophobic insecticidal compositions comprising DDVP as active ingredient, an ordinary paraffin or a Vaseline as higher alkanes, an incorporating agent selected

TABLE IX

|  | 81 | 82 | 83 | 84 | 85 | 86 | 87 | 88 | 89 | 90 |
|---|---|---|---|---|---|---|---|---|---|---|
| DDVP | 20.0 | 58.0 | 40.0 | 50.0 | 25.0 | 6.2 | 50.0 | 89.2 | 40.0 | 20.0 |
| Vaseline oil [d] | 22.2 |  | 10.0 |  | 25.0 |  |  | 20.4 | 40.2 |
| Paraffin oil [a] |  | 36.0 | 25.3 |  | 22.5 |  | 29.6 | 3.0 |  |  |
| Isopropyl myristate |  | 6.0 |  |  |  |  |  |  | 19.9 |  |
| Glycol dibutyrate | 55.8 |  |  |  |  |  |  |  |  |  |
| 1-bromo-dodecane |  |  | 34.7 |  |  | 67.0 | 14.4 |  |  |  |
| 1-chloro-hexadecane |  |  |  | 39.6 |  |  |  | 7.0 |  |  |
| 1-chloro-octadecane |  |  |  | 48.0 |  |  |  |  |  | 15.8 |
| Stearone [b] |  |  |  |  |  | 6.0 |  |  |  | 5.0 |
| 4-vinyl-anisole | 1.0 |  |  | 2.0 |  |  |  |  |  |  |
| Tetrachlorobiphenyl [r] |  |  |  |  |  |  |  |  | 19.7 | 15.0 |
| Allo-ocimene dioxide [s] | 1.0 |  |  | 2.5 | 1.2 |  | 0.1 |  | 4.0 |
| Diazene V [n₃] |  |  | 0.4 |  |  |  | 0.7 |  |  |  |
| Diazene VI [n₄] |  |  |  | 0.6 |  |  |  |  |  |  |

[d, a] See footnotes at bottom of Table I.
[b] See footnotes at bottom of Table III.
[r] Mixture of tetrachloro biphenyls having a density of from 1.447 to 1.457 at 25° C. and sold under the trademark "Electrophenyl T" by the French company Electrochimie, Electrometallurgie et Acieries in Ugine.
[s] Common name of 2,3:6,7-diepoxy-2,7-dimethyl-4-octene.
[n₃] 4-phenylazo-diethylaniline.
[n₄] Compound known under the name of azoanisole.

from methyl laurate, stilbene, phenoxybenzene, 1-chlorododecane and chlorinated biphenyls, and in some cases an inert filler and/or a stabilizer selected from the diazenes (values are expressed in percent by weight).

The compositions defined in the preceding examples, of course, are not limited to DDVP as active ingredient, which may be replaced in these compositions by one of the phosphoric or thiophosphoric acid esters previously cited.

TABLE XI

|  | 101 | 102 | 103 | 104 | 105 | 106 | 107 | 108 | 109 | 110 |
|---|---|---|---|---|---|---|---|---|---|---|
| DDVP | 23.4 | 20.2 | 5.0 | 20.0 | 25.0 | 59.0 | 53.7 | 50.0 | 38.1 | 38.1 |
| Ordinary paraffin 60-62° | 43.6 | 37.4 | 10.0 |  | 47.3 |  |  |  |  |  |
| Vaseline [p] |  |  |  | 2.0 |  | 31.5 | 28.8 | 26.9 | 38.1 | 38.4 |
| Methyl laurate |  |  |  |  |  |  |  |  |  | 23.5 |
| Stilbene |  |  |  |  |  | 9.0 |  |  |  |  |
| Phenoxybenzene |  |  |  |  |  |  |  |  | 23.0 |  |
| 1-chloro-dodecane |  | 12.8 |  | 4.0 |  |  | 16.5 |  |  |  |
| Tetrachlorobiphenyl [r] |  | 22.4 |  |  |  |  |  | 23.1 |  |  |
| Octachlorobiphenyl [j] |  |  | 40.0 | 4.0 | 27.7 |  |  |  |  |  |
| Glass fibers | 5.0 | 5.0 | 43.0 |  |  |  |  |  |  |  |
| Fossil diatomaceous earth | 14.0 |  |  | 25.0 |  |  |  |  |  |  |
| Kaolin |  | 14.5 |  | 43.0 |  |  |  |  |  |  |
| Irgalite Blue BL [t] | 1.0 |  | 1.5 | 2.0 |  |  |  |  |  |  |
| Diazene II [f] | 0.2 |  |  |  | 0.5 |  |  |  |  |  |
| Diazene IV [n2] |  | 0.5 | 0.5 |  |  |  | 1.0 |  | 0.8 |  |

[p] See footnotes at bottom of Table I.
[r] See footnotes at bottom of Table IX.
[j] Mixture of octachloro-biphenyls having a softening point of $110\pm10°$ C., sold under the trademark "Electrophenyl O" by the French company Electrochemie, Electrometallurgie et Acieries in Ugine.
[t] Pigment given in the Color Index under the number 74,160 (Pigment Blue 15).
[f] See footnotes at bottom of Table I.
[n2] See footnotes at bottom of Table IV.

EXAMPLES 111 TO 120

Hydrophobic insecticidal compositions comprising DDVP as active ingredient, a higher alkane selected from Vaseline oil, ordinary paraffin and petrolatum, an incorporating agent selected from laurone, stearone and 1-chloro-octadecane, and a supplementary substance selected from insect repellents and/or insecticides (1,4-dichlorobenzene and naphthelene), scents (terpenes of oranges and α-ionone), bactericides and/or germicides and/or disinfectants (phenol and thymol) and stabilizers (diazenes). (Values are expressed in percent by weight.)

EXAMPLES 121 TO 128

Hydrophobic insecticidal compositions comprising DDVP as active ingredient, paraffin 60-62° C. as higher alkane, an incorporating agent selected from phenoxybenzene, biphenyl, diphenyl methane and fluorene, and optionally a supplementary substance selected from thickening agents (Alugel 44 DM, Bentone 38), dispersing agents (Inipol 002), stabilizers (azobenzene), and pigments. (Values are expressed in percent by weight.)

TABLE XII

|  | 111 | 112 | 113 | 114 | 115 | 116 | 117 | 118 | 119 | 120 |
|---|---|---|---|---|---|---|---|---|---|---|
| DDVP | 58.5 | 58.5 | 53.0 | 14.0 | 50.0 | 18.0 | 50.0 | 54.0 | 70.0 | 25.0 |
| Vaseline oil [d] | 22.5 | 22.5 | 20.0 |  | 22.0 |  | 25.0 | 20.0 | 15.0 | 25.0 |
| Petrolatum [q] |  |  | 5.0 |  | 6.0 |  |  |  |  |  |
| Ordinary paraffin 52-54° |  |  |  | 69.0 |  | 60.0 |  |  |  | 6.5 |
| Laurone [e] |  |  | 7.0 |  | 12.0 | 19.0 |  |  |  |  |
| Stearone [b] | 9.0 | 9.0 |  | 15.3 |  |  | 20.0 | 18.0 | 11.7 |  |
| 1-chloro-octadecane |  |  |  |  |  |  |  |  | 2.0 |  |
| 1,4-dichlorobenzene |  |  |  | 15.0 |  |  |  |  |  | 30.0 |
| Naphthalene |  |  |  | 0.5 | 10.0 |  |  |  |  | 3.0 |
| Terpenes of oranges |  |  | 9.0 |  |  | 2.0 |  |  |  |  |
| α-Ionone | 5.0 |  |  |  |  | 0.5 |  | 1.0 | 1.0 |  |
| Phenol |  |  |  |  |  |  | 5.0 | 3.0 |  |  |
| Thymol |  |  |  |  |  |  |  | 4.0 |  | 10.0 |
| Diazene I [o] | 3.0 | 1.0 |  | 0.8 |  | 0.3 |  |  |  |  |
| Diazene VIII [u] | 2.0 |  |  | 0.4 |  | 0.2 |  |  | 0.3 | 0.5 |

[d], [o] See footnotes at bottom of Table I.
[q] See footnotes at bottom of Table V.
[e] See footnotes at bottom of Table II.
[b] See footnotes at bottom of Table III.
[u] 1-(4-phenylazo-phenylazo)-2-ethylamino-naphthalene, compound resulting from the coupling of 2-ethylamino-naphthalene and the diazotation product of 4-amino-benzene; this compound can also be considered to be 1-(4-phenylazo-phenylhydrazono)-1,2-dihydro-2-ethylimino-naphthalene corresponding to its hydrazonic form.

TABLE XIII

|  | 121 | 122 | 123 | 124 | 125 | 126 | 127 | 128 |
|---|---|---|---|---|---|---|---|---|
| DDVP | 25 | 25 | 25 | 25 | 25 | 25 | 25 | 25 |
| Paraffin 60-62° | 34.8 | 34.8 | 49 | 38 | 40 | 44 | 54 | 40 |
| Phenoxybenzene | 40 | | | | | | | |
| Biphenyl | | 40 | | | | | | |
| Diphenyl methane | | | 20 | 15 | 20 | 10 | | |
| Fluorene | | | | 15 | 10 | 20 | 20 | 35 |
| Alugel 44 DM ᵛ | | | 6 | | | | | |
| Bentone 38 ᵐ | | | | 7 | 4 | | | |
| Inipol 002 ʷ | | | | | | 1 | | |
| Azobenzene | | | | | | | 1 | |
| Irgalite Yellow BAW ¹ | 0.2 | 0.2 | | | | | | |

ᵛ Mixture of aluminum distearate and aluminum monostearate (weight ratio 4:1).
ᵐ Ammonium salt of dimethyl-dialkyl-montmorillonite wherein the alkyl moiety comprises an average of 17 carbon atoms, sold by the National Lead Company.
ʷ Mixture containing: 10% of hexadecyl-amino-propylene-amine dioleate, 5% of octadecyl-amino-propylene-amine dioleate, 85% of octadecenyl-amino-propylene-amine dioleate, sold by the company Prochinor in Neuilly-sur-Seine.
¹ See footnotes at bottom of TABLE VII.

EXAMPLES 138 TO 149

Hydrophobic insecticidal compositions comprising DDVP as active ingredient, paraffin 60–62° C. as higher alkane, an incorporating agent selected from phenoxybenzene, biphenyl, diphenyl methane, fluorene, indene and stilbene, and optionally a supplementary substance selected from thickening agents (Alugel 44 DM, Alugel 30 DF, aluminum lactate), dispersing agents (Inipol 002), stabilizers selected from heterocyclic azo compounds (10,11-dihydro - 5H - dibenzo[b,f]azepine), amino compounds (EDTA Na₂Ca), epoxy compounds (epoxidized soyabean oil), an inert filler selected from calcium sulphate anhydrite and kaolin, and a pigment. (Values are expressed in percent by weight.)

TABLE XV

|  | 138 | 139 | 140 | 141 | 142 | 413 | 144 | 145 | 146 | 147 | 148 | 149 |
|---|---|---|---|---|---|---|---|---|---|---|---|---|
| DDVP | 25 | 25 | 25 | 25 | 25 | 25 | 25 | 25 | 25 | 25 | 25 | 2 |
| Paraffin 60-62° | 57.5 | 35 | 35 | 42.5 | 44.5 | 46.5 | 41.5 | 40.5 | 39.5 | 44.5 | 44.5 | 34.8 |
| Phenoxybenzene | 5 | | 40 | 20 | 15 | | 15 | 15 | 20 | 20 | 20 | |
| Biphenyl | | 40 | | | | | | | | | | |
| Dipenyl methane | | | | | | | 20 | | | | | |
| Fluorene | | | | | | | | 10 | | | | |
| Indene | | | | | | 10 | | | 5 | | | |
| Stilbene | | | | | | | | | | 5 | | |
| Dibenzofuran | | | | | | | | | | | | 40 |
| Bentone 38 ᵐ | | 9 | | | | | 1 | | | | | |
| Alugel 44 DM ᵛ | | | | 6 | 5 | 6 | | 6 | | | | |
| Alugel 30 DF ˣ | | | | | | | | | | 4 | 5 | 5 |
| Aluminium lactate | | | | | | | 2 | | | | | |
| Inipol 002 ʷ | | | | | | 10 | | | | | | |
| 10,11-dihydro-5H-dibenzo[b,f]azepine | | | | | | | 1 | | | | | |
| EDTA Na₂Ca ʸ | | | | 1 | | | 1 | | 1 | | | |
| Epoxidized soyabean oil | 3 | | | | | | | | 1 | | | |
| Calcium sulphate hydrite | | | | 5 | | | | | | | | |
| Kaolin | | | | | | | 7 | | | | | |
| Irgalite Yellow BAW ¹ | 0.5 | | | 0.5 | 0.5 | 0.5 | 0.5 | 0.5 | 0.5 | 0.5 | 0.5 | 0.2 |

ᵐ ⁿ ʷ See footnotes at end of Table XIII.
ˣ ʸ See footnotes at end of Table XIV.
¹ See footnotes at bottom of TableVII.

EXAMPLES 129 TO 137

Hydrophobic insecticidal compositions comprising DDVP as active ingredient, paraffin 60–62° C. as higher alkane, an incorporating agent selected from phenoxybenzene, biphenyl, diphenyl methane, and optionally a supplementary substance selected from thickening agents (aluminum stearates, Bentone 38), dispersing agents (Inipol 002), stabilizers selected from amino compounds (EDTA Na₂Ca), epoxy compounds (epoxidized soyabean oil, epoxy stearate), or heterocyclic azo compounds (10,11-dihydro-5H-dibenzo[b,f]-azepine), and pigments (Values are expressed in percent by weight.)

What is claimed is:

1. Hydrophobic insecticidal composition comprising as essential components:
(A) 5 to 90% of an active substance selected from the group of volatile phosphoric or thiophosphoric acid esters defined by the following formula:

(I)

TABLE XIV

|  | 129 | 130 | 131 | 132 | 133 | 134 | 135 | 136 | 137 |
|---|---|---|---|---|---|---|---|---|---|
| DDVP | 25 | 25 | 25 | 25 | 25 | 25 | 25 | 25 | 25 |
| Paraffin 60-62° | 46.5 | 52.5 | 49 | 57.5 | 46 | 55 | 34.5 | 49.5 | 45.99 |
| Phenoxybenzene | 20 | 10 | 20 | 5 | | | | 20 | 20 |
| Biphenyl | | | | | | | 40 | | |
| Diphenyl methane | | | | | 29 | 20 | | | |
| Alugel 30 DF ˣ | | | 5 | | | | | 4.0 | 3 |
| Alugel 44 DM ᵛ | 8 | | | | | | | | |
| Bentone 38 ᵐ | | 9 | | 9 | | | | | |
| Epoxidized soyabean oil | | 3 | | 3 | | | | | |
| Isooctyl epoxy-stearate | | | | | | | | | 5 |
| EDTA Na₂Ca ʸ | | | 1 | | | | | 1 | 1 |
| Diazene X ⁿ⁶ | | | | | | | | | 0.01 |
| Irgalite Yellow BAW ¹ | 0.5 | 0.5 | | 0.5 | | | 0.5 | 0.5 | |

ˣ Aluminum distearate sold by the German company Barlocher.
ᵛ See footnotes at bottom of Table XIII.
ᵐ See footnotes at bottom of Table XIII.
ʸ Abbreviation designating calcium disodium ethylenediaminetetra-acetate.
ⁿ⁶ Pigment resulting from the coupling of the diazotation product of 2-nitro-p-toluidine with 2-amino-5-dimethyl-6-carboxyethyl-1,3-cyclohexadione.
¹ See footnotes at bottom of Table VII.

wherein X is an oxygen or sulphur atom, R and R' are the same or different and represent alkyl radicals containing 1 to 4 carbon atoms, R" being selected from one of the following two groups (i) and (ii):

(i)

(II)

(ii)

(III)

wherein Y is selected from halogens having at most an atomic weight of 80, and R''' and R'''', identical or different, are selected from a hydrogen, said halogens, or the methyl or ethyl radical;

(B) at least one straight or branched chain higher alkane having at least 18 carbon atoms and having a melting point of less than 120° C. and a vapor pressure at 20° C. of less than 0.001 torr, said alkane being present at about 2 to about 85% by weight based on the combined weight of components A+B+C; and (C) at least one incorporating agent which has a vapor pressure at 20° C. of less than 0.05 torr and a melting point of less than 120° C. and is selected from:
  (1) alkanones having 11 to 55 carbon atoms, alkenones having 12 ot 35 carbon atoms, and alkanophenones represented by the formula (IV)

wherein
  $R_a$ is an alkyl radical having at most 19 carbon atoms and
  $R_a'$ represents hydrogen or 1 to 3 substituents selected from halogens, alkyl radicals having 1 to 5 carbon atoms, and alkoxy groups having 1 to 4 carbon atoms;
  (2) halogenated alkanes having at least 8 carbon atoms in which the halogen does not exceed 50% by weight, said halogen being selected from chlorine and bromine;
  (3) hydrocarbons and halogeno-hydrocarbons having at least one benzene ring represented by the formula:

(V)

wherein
  $R_b$ represents hydrogen, 1 to 4 chlorine or bromine atoms, 1 to 4 alkyl radicals 1 to 4 carbon atoms, an alkoxy radical having 1 to 5 carbon atoms or 1 to 2 vinyl radicals,
  $R_b'$ represents hydrogen or a chlorine or bromine atom or an alkyl radical having 1 to 4 carbon atoms,
  $R_b''$ represents the phenyl radical, the phenyl radical substituted by 1 to 5 chlorine atoms, the biphenyl radical, the biphenyl radical substituted by 1 to 9 chlorine atoms, the benzyl radical, the phenethyl radical, the styryl radical, the phenoxy radical, the benzyloxy radical, an alkoxy group having 1 to 5 carbon atoms, or an alkyl radical having 1 to 12 carbon atoms, or
  $R_b'$ and $R_b''$, taken together, represent a divalent radical selected from
    (a) the 1-propene-1,3-diyl radical;
    (b) the 1-oxa-2,3-propene-1,3-diyl radical;
    (c) the above radicals (a) and (b) substituted by 1 to 2 substituents selected from lower alkyl radicals having 1 to 3 carbon atoms,
lower alkoxy radicals having 1 to 3 carbon atoms,
the phenyl radical,
chlorine or bromine;
    (d) the orthobenzylene radical;
    (e) the ortho-phenylene-oxy radical; and
    (f) the above radicals (d) and (e) substituted by 1 to 4 substituents selected from
      alkyl radicals having 1 to 3 carbon atoms,
      alkoxy radicals having 1 to 4 carbon atoms,
      chlorine and bromine, and
      at most 3 phenyl radicals, and
      at most one vinyl radical;
  (4) carboxylic acid esters selected from esters formed from
    monocarboxy alkanes and alkanols,
    monocarboxy alkenes and alkanols,
    diesters formed from
      dicarboxy hydrocarbons and alkanols, and
      monocarboxy hydrocarbons and alkane diols;
the amount of incorporated agent C, calculated on the weight of the mixture of components B+C comprises from 10 to 80%; the amount of the mixture of components B+C calculated on the weight of the mixture A+B+C comprises from 10 to 95%, and the amount of component C being from about 10 to 80% of the weight of components A+B+C;

(D) from 0 to about 10% based on the total weight of the composition of a thickening agent capable of thickening said composition at a temperature at which it is liquid;
(E) from 0 to about 10% based on the total weight of the composition of a dispersing agent capable of dispersing the various additives and the pigments in the composition at a temperature at which it is liquid; and
(F) from 0 to about 10% based on the total weight of the composition of an anti-hydrolytic decomposition agent which stabilizes component (A) against decomposition by hydrolysis.

2. Composition according to claim 1, characterized in that the incorporating agent (C) is selected from the following compounds:
(1') alkanones having at least 20 carbon atoms, alkenones having at least 20 carbon atoms, and alkanophenones represented by the Formula V wherein $R_a$ represents an alkyl radical having at least 15 carbon atoms, and $R_a'$ has the same meaning as in the definition given above;
(2') chloro-alkanes, bromo-alkanes and chloro-bromo-alkanes having at least 16 carbon atoms and in which the amount of halogen does not exceed 50% by weight;
(3') hydrocarbons and halogeno-hydrocarbons having at least one benzene ring represented by the formula:

(V)

wherein
$R_b$ represents hydrogen or 1 to 4 chlorine or bromine atoms, or 1 to 2 vinyl radicals,
$R_b'$ represents hydrogen or a chlorine or bromine atom, and
$R_b''$ represents the phenyl radical, the phenyl radical substituted by 1 to 5 chlorine atoms, the biphenyl radical, the biphenyl radical substituted by 1 to 9 chlorine atoms, the benzyl radical, the phenethyl radical, the styryl radical, the phenoxy radical, the benzyloxy radical, or an alkyl radical having at least 8 carbon atoms, or
$R_b'$ and $R_b''$, taken together, represent a divalent radical selected from
    (a) the 1-propene-1,3-diyl radical;

(b) the 1-oxa-2,3-propene-1,3-diyl radical;
(c) the above radicals (a) and (b) substituted by 1 to 2 substituents selected from
lower alkyl radicals having 1 to 3 carbon atoms,
lower alkoxy radicals having 1 to 3 carbon atoms,
the phenyl radical,
chlorine or bromine;
(d) the orthobenzylene radical;
(e) the ortho-phenylene-oxy radical; and
(f) the above radicals (d) and (e) substituted by 1 to 4 substituents selected from
alkyl radicals having 1 to 3 carbon atoms,
alkoxy radicals having 1 to 4 carbon atoms,
chlorine and bromine, and
at most 3 phenyl radicals, and
at most one vinyl radical.

3. Composition according to claim 1, characterized in that, in Formula I defining the active ingredient, X represents an oxygen atom and R' is defined by Formula III.

4. Composition according to claim 3, characterized in that the active ingredient (A) is O,O-dimethyl O-(2,2-dichlorovinyl) phosphate.

5. Composition according to claim 1, characterized in that it contains 30 to 75% of the mixture (B)+(C), calculated on the total weight of the components (A)+(B)+(C).

6. Composition according to claim 1, characterized in that it comprises a mixture of higher alkanes selected from Vaseline oils, paraffin oils, heavy oils, gas oils, fuel oils, road oils, valve oils, diesel oils, petrolatums, crude paraffins, microwaxes, tank bottom waxes, ozocerites, ceresines, isoparaffins, and ordinary paraffins.

7. Composition according to claim 1, characterized in that the incorporating agent (C) comprises at least one compound selected from an alkanone having 30 to about 35 carbon atoms.

8. Composition according to claim 1, characterized in that it contains:
(A) about 40 to 70 parts by weight of O,O-dimethyl O-(2,2-dichlorovinyl) phosphate,
(B) about 20 to 50 parts by weight of Vaseline oil or paraffin oil, and
(C) about 6 to 20 parts by weight of 12-tricosanone or 18-pentatriacontanone, or a mixture of these two compounds.

9. Composition according to claim 1, characterized in that the incorporating agent (C) comprises at least one compound selected from biphenyl, chlorinated biphenyls, ortho- and para-diphenyl benzenes, diphenyl-methane, phenoxy-benzene, stilbene, indene, fluorene, and benzofuran and dibenzofuran.

10. Composition according to claim 1, characterized in that it contains as supplementary substance a thickening agent for the liquid composition consisting of one or more aluminum salts of fatty acids in an amount comprising from 1 to 10%, calculated on the weight of the composition.

11. Composition according to claim 10, characterized in that the thickening agent is selected from aluminum mono-, di-, and tri-stearate, aluminum lactate, and a mixture of at least two of these compounds.

12. Composition according to claim 10, characterized in that the thickening agent consists of at least one montmorillonite modified by an alkylamine.

13. Composition according to claim 12, characterized in that the thickening agent is dimethyl-dialkyl montmorillonite in which the alkyl radical has an average of 17 carbon atoms.

14. Composition according to claim 1, characterized in that it contains as supplementary substance a dispersing agent consisting of at least one salt of a fatty acid amine and a fatty acid in an amount comprising from 1 to 10%, calculated on the weight of the composition.

15. Composition according to claim 14, characterized in that the dispersing agent is selected from hexadecyl-amino-propylene-amine dioleate, octadecyl-amino-propylene-amine dioleate, octadecenyl-amino-propylene - amine dioleate, and a mixture of at least two of these compounds.

16. Composition according to claim 1, characterized in that it comprises an supplemental additive an agent selected from scents, deodorants, bactericides, germicides and disinfectants, pigments, pumice, vermiculite, kaolin, dried clay, calcium carbonate, pyrophyllite, calcium sulphate anhydrite, dolomite, glass fibers, gypsum, talcum, fossil or non-fossil natural silica, synthetic silica, metallic oxides, sawdust, wood fibers, cellulosic fibers, corn and potato starch.

17. Composition according to claim 1, characterized in that it contains:
(A) about 15 to 35 parts by weight of O,O-dimethyl O-(2,2-dichlorovinyl) phosphate,
(B) about 25 to 70 parts by weight of paraffin (60–62° C.),
(C) about 5 to 25 parts by weight of phenoxybenzene,
(D) from 0 to about 10 parts by weight of aluminum stearate selected from aluminum mono-, di- and tri-stearate, and a mixture of at least two of these compounds,
(E) from 0 to about 10 parts by weight of an agent which stabilizes the insecticide (A) against decomposition by hydrolysis.

18. Composition according to claim 1, characterized in that it contains as supplementary substance at least one agent which stabilized the insecticide (a) against hydrolysis selected from epoxidized oils, alkyl and cycloalkyl epoxystearates, amino compounds, heterocyclic azo compounds, diazenes and their metal derivatives, and benzodioxoles in an amount comprising from 0.1 to 10%, calculated on the weight of the insecticide (A).

19. Composition according to claim 1, characterized in that it contains as stabilizer for the insecticide (A), calcium disodium ethylenediamine tetraacetate in an amount comprising from 0.1 to 10%, calculated on the weight of the insecticide (A).

20. Composition according to claim 1, characterized in that it contains as stabilizing agent for the insecticide (A), 10,11-dihydro-5H-dibenzo[b,f]azepine in an amount comprising from 0.1 to 10%, calculated on the weight of the insecticide (A).

21. Composition according to claim 1, characterized in that it contains as stabilizer for the insecticide (A), at least one alkyl or cycloalkyl epoxy-stearate in an amount comprising from 0.1 to 10%, calculated on the weight of the insecticide (A).

22. Composition according to claim 21, characterized in that it contains as supplementary substance iso-octyl 8,9-epoxy-stearate in an amount comprising from 0.1 to 10%, calculated on the weight of the insecticide (A).

23. Insecticidal composition containing as active ingredient O,O-dimethyl O-(2,2-dichlorovinyl) phosphate and an agent which stabilizes said active ingredient against hydrolysis, characterized in that the stabilizing agent is calcium disodium ethylenediamine tetra-acetate.

24. Insecticidal composition containing as active ingredient O,O-dimethyl O-(2,2-dichlorovinyl) phosphate and an agent which stabilizes said active ingredient against hydrolysis, characterized in that the stabilizing agent is 10,11-dihydro-5H-dibenzo[b,f]azepine.

No references cited.

SHEP K. ROSE, Primary Examiner

U.S. Cl. X.R.
43—131; 239—60